(12) United States Patent
Navarro Y Garcia et al.

(10) Patent No.: US 12,441,999 B2
(45) Date of Patent: Oct. 14, 2025

(54) HYBRID htiRNA/NANOPARTICLE COMPLEX AND USE THEREOF FOR TREATING A DISEASE OF THE DIGESTIVE SYSTEM

(71) Applicant: COMMISSARIAT A L'ENERGIE ATOMIQUE ET AUX ENERGIES ALTERNATIVES, Paris (FR)

(72) Inventors: Fabrice Navarro Y Garcia, Grenoble (FR); Dorothee Jary, Grenoble (FR); Adrien Nougarede, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 942 days.

(21) Appl. No.: 17/627,040

(22) PCT Filed: Jul. 15, 2020

(86) PCT No.: PCT/EP2020/070022
§ 371 (c)(1),
(2) Date: Jan. 13, 2022

(87) PCT Pub. No.: WO2021/009242
PCT Pub. Date: Jan. 21, 2021

(65) Prior Publication Data
US 2023/0136944 A1  May 4, 2023

(30) Foreign Application Priority Data
Jul. 15, 2019  (FR) .................................... 19 07965

(51) Int. Cl.
*C12N 15/113*  (2010.01)
*A61K 9/1271*  (2025.01)

(52) U.S. Cl.
CPC .......... *C12N 15/113* (2013.01); *A61K 9/1271* (2013.01)

(58) Field of Classification Search
CPC .............. C12N 15/113; C12N 2310/14; C12N 2320/52; C12N 15/111; A61K 9/1271; A61P 1/00; C07H 21/00
See application file for complete search history.

(56) References Cited

U.S. PATENT DOCUMENTS

| 2015/0258022 A1 | 9/2015 | Navarro Y Garcia et al. |
| 2016/0208245 A1 | 7/2016 | Ahn et al. |

FOREIGN PATENT DOCUMENTS

| FR | 2 994 849 A1 | 3/2014 |

OTHER PUBLICATIONS

Chevalier, Rachel; Clinical and Translational Science, vol. 12, p. 583 col. 1, Aug. 5, 2019 (Year: 2019).*
Kang et al., Journal of Biomedical Science, vol. 30:88, p. 4 col. 2, Oct. 16, 2023 (Year: 2023).*
Mochizuki et al. Biochemical and Biophysical Research Communications, vol. 428, Issue 4 p. 433-437. (Nov. 30, 2012) (Year: 2012).*
Afonin K. et al. Nature Nanotechnology, vol. 8, p. 296-304 (Mar. 31, 2013) (Year: 2013).*
International Search Report mailed on Sep. 28, 2020 in PCT/EP2020/070022 filed on Jul. 15, 2020 (3 pages).
Afonin et al., "Triggering of RNA Interference with RNA—RNA, RNA-DNA and DNA-RNA Nanoparticles", ACS Nano, Dec. 18, 2014, DOI: 10.1021/nn504508s, ISSN: 1936-0851, XP055164747, (9 total pages).
Kozielski et al., "Bioengineered nanoparticles for siRNA delivery", Wiley Periodicals, Inc., Wiley Interdisciplinary Reviews: Nanomedicine and Nanobiotechnology, vol. 5, 2013, pp. 449-468, XP055160902.

* cited by examiner

*Primary Examiner* — Celine X Qian
*Assistant Examiner* — Krishna N Ravindra
(74) *Attorney, Agent, or Firm* — Oblon, McClelland, Maier &Neustadt, L.L.P.

(57) ABSTRACT

A hybrid DNA/RNA molecule, or a complex thereof with at least one nanoparticle, may be used for the prevention or treatment of a disease, in particular a disease of the digestive system.

Figure 1:
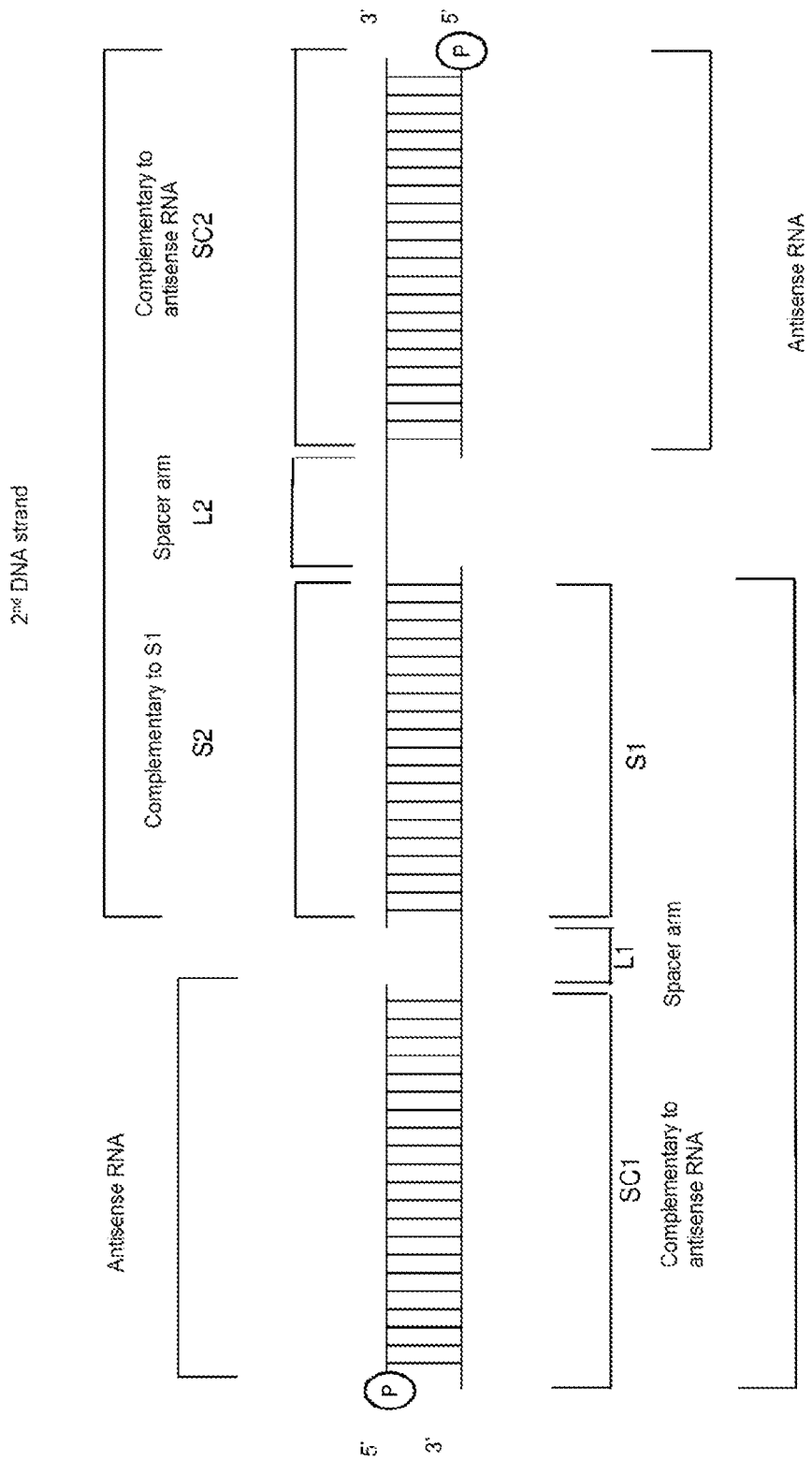

14 Claims, 7 Drawing Sheets
Specification includes a Sequence Listing.

HYBRID htiRNA/NANOPARTICLE COMPLEX AND USE THEREOF FOR TREATING A DISEASE OF THE DIGESTIVE SYSTEM

CROSS-REFERENCE TO RELATED APPLICATIONS

The present application is the national stage of international application PCT/EP2020/070022, filed on Jul. 15, 2020, and claims the benefit of the filing date of France Appl. No. 1 907 965, filed on Jul. 15, 2019.

The present invention relates to a complex of hybrid DNA/RNA molecules called «htiRNA hybrids» and nanoparticles, and to the therapeutic use thereof in particular to treat a disease of the digestive system.

siRNAs are increasingly used as medicinal candidates. siRNAs comprise two RNA strands each generally having a length of 21 to 23 nucleotides, including:
an antisense strand which is able to pair by complementarity with the messenger RNA of a target gene, and
a sense or passenger strand complementary to the antisense strand.

By attaching to the messenger RNA of a target gene, the antisense strand of a siRNA will cause functional inhibition of the expression of this target gene via the RNA interference mechanism, the sense strand not being used throughout this process. This RNA interference mechanism can therefore be used to modulate the expression of the target gene for a therapeutic purpose.

The greatest barrier against use of siRNAs as medication is their very low bioavailability. To improve pharmacokinetic properties and ensure the intracellular bioavailability of an active hydrophilic molecule such as a siRNA, it is possible to associate this molecule with a lipid nanoparticle (LNP) which will protect the siRNA allowing transport thereof and hence the reaching of its target. In particular, the attaching of a siRNA which is an anionic molecule (net negative charge) is possible on a cationic lipid nanoparticle (net positive charge) via electrostatic interaction.

Lipid nanoparticles can be in isolated form or they can be the droplets of an emulsion in which the dispersed phase is lipidic.

Application FR 2 994 849 describes a nanoemulsion comprising a continuous aqueous phase and dispersed phase in droplet form particularly comprising a cationic surfactant. This surfactant allows complexing of siRNA onto the LNPs of the dispersed phase.

The transporting efficiency of a siRNA by a nanoparticle is chiefly dependent on the stability of the siRNA-nanoparticle complex in a biological fluid. The inventors of the present application have observed that the siRNA-LNP complex described in application FR 2 994 849 is stable in an artificial medium which is not physiological (cell culture medium) but that separation of the siRNA and LNPs occurs in a complex medium reproducing physiological conditions, in particular the conditions of the distal colon.

There is therefore a need to provide a siRNA vehicle which is more stable in a physiological medium than prior art vehicles whilst allowing biological efficiency to be maintained, to permit administration via oral, topical, intrarectal or ophthalmological route. In particular, a formulation allowing oral administration is desired which requires that the siRNA vehicle is able to pass through the different intestinal media under extreme conditions (pH, biliary salts, enzymes . . . ) to enable the siRNA to reach its target.

For this purpose, a first subject of the invention concerns a hybrid DNA/RNA molecule called htiRNA comprising:
two antisense RNA strands of same sequences and able to modulate endogenous mechanisms of RNA interference, each comprising a number $n_{RNA}$ of nucleotides of 18 to 30, and having a phosphorylated 5' end;
a first DNA strand having a nucleotide sequence comprising a nucleotide sequence S1 linked by its 3' end to the 5' end of a nucleotide spacer arm L1 linked by its 3' end to the 5' end of a nucleotide sequence SC1; and
a second DNA strand having a nucleotide sequence comprising a nucleotide sequence S2 linked via its 3' end to the 5' end of a nucleotide spacer arm L2 linked via its 3' end to the 5' end of a nucleotide sequence SC2,
where:
the nucleotide sequence SC1 comprises a number $n_{SC1}$ of nucleotides with $n_{SC1}$ from $(n_{RNA}-3)$ to $(n_{RNA}+3)$ and has at least 40% sequence identity, determined by a global alignment method, with the complementary sequence of the antisense RNA, so that the nucleotide sequence SC1 is hybridized via complementarity to a first of the two antisense RNA strands;
the nucleotide sequence SC2 comprises a number $n_{SC2}$ of nucleotides with $n_{SC2}$ from $(n_{RNA}-3)$ to $(n_{RNA}+3)$ and has at least 40% sequence identity, determined by a global alignment method, with the complementary sequence of the antisense RNA, so that the nucleotide sequence SC2 is hybridized via complementarity to the second of the two antisense RNA strands;
the nucleotide sequence S1 of the first DNA strand is complementary to the nucleotide sequence S2 of the second DNA strand, so that the nucleotide sequence S1 of the first DNA strand is hybridized via complementarity to the nucleotide sequence S2 of the second DNA strand;
the two nucleotide sequences S1 and S2 have the same number $n_{S1-S2}$ of nucleotides, $n_{S1-S2}$ being a number of 16 to 30;
the nucleotide spacer arm L1 of the first DNA strand comprises a number $n_{L1}$ of nucleotides, and the nucleotide spacer arm L2 of the second DNA strand comprises a number $n_{L2}$ of nucleotides, $n_{L1}$ and $n_{L2}$ each independently being a number of 1 to 15;
the two antisense RNA strands, the first DNA strand and/or the second DNA strand optionally carry one or more lipid groups.

The invention is based on the discovery that the htiRNA hybrid defined above is capable of forming a more stable complex with a nanoparticle in a physiological medium than a complex obtained by complexing the same nanoparticle with the antisense RNA contained therein, whilst maintaining the capability of modulating the endogenous mechanisms of RNA interference. In this case, the htiRNA hybrid/nanoparticle complex allows a good compromise to be obtained between stability of the complex, allowing de-complexing in physiological media to be prevented, and efficient modulation of the endogenous mechanisms of RNA interference. Said compromise is difficult to obtain since, if the complex is too stable, the antisense RNA is not released and it cannot modulate the endogenous mechanisms of RNA interference, but if the complex is not sufficiently stable the antisense RNA undergoes early release and is unable to reach its target.

Modifications to the structure of a siRNA have been described in the literature, such as lengthening of the sense RNA strand or replacement thereof by DNA. Lengthening of the size of a siRNA beyond 30 base pairs leads to an inflammatory response, which means that lengthening siRNAs is avoided. In addition, to the knowledge of the inventors, none of these modifications has been used to obtain a htiRNA hybrid such as defined above, or to stabilize the complexing of RNA medication on a nanoparticle.

Without wishing to be bound by any particular theory, the inventors assume that this improved stabilization of the htiRNA hybrid/nanoparticle complex could be accounted for by the increase in the length of the nucleic acid molecule ($n_{SC1}+n_{L1}+n_{S1}+n_{RNA}$) compared with the length of the antisense RNA ($n_{RNA}$ of 21 to 23 nucleotides when it is single strand, or 42 to 46 bases when it is double strand), which would induce a higher total net charge of the htiRNA hybrid compared with that of the antisense RNA, and hence better affinity of the htiRNA hybrid with the nanoparticle by means of greater electrostatic forces. This better affinity could account for the better stability of the htiRNA hybrid/nanoparticle complex in complex physiological fluids, by preventing or limiting separation thereof via competition with the different electrolytes and charged macromolecules contained in a complex biological medium. This reinforced stability therefore allows increased delivery efficacy of a siRNA of which the antisense sequence is included in the structure of the htiRNA.

The structure of the htiRNA is illustrated in [FIG. 1] FIG. 1.

The htiRNA hybrid is a hybrid of RNA and DNA. The htiRNA hybrid comprises four strands: two RNA strands and two DNA strands. The htiRNA hybrid is a dimer of two monomer units illustrated in [FIG. 2] FIG. 2, where each monomer unit comprises:

an antisense RNA strand (identical between the two monomer units), and
a DNA strand (either the first strand or the second strand defined above), which comprises:
a nucleotide sequence SC1 or SC2 at least partly complementary to the antisense RNA; and
a nucleotide sequence S1 or S2 complementary to the sequence of the other monomer unit (S1 complementary to S2 and vice versa).

The htiRNA hybrid contains two antisense RNAs, which maximizes the number of siRNAs by comparison for example with a structure in which only inert DNA is added to the siRNA. Each of the two antisense RNA strands comprises a number $n_{RNA}$ of nucleotides of 18 to 30, in particular 19 to 27, for example 20 to 25, preferably 21 to 23.

Each of the nucleotide sequences SC1 and SC2 can independently have up to three nucleotides fewer or more, compared with the antisense RNA sequence. In addition, the nucleotide sequences SC1 and SC2 must comprise at least 40% identity, preferably at least 45%, 50%, 55%, 60%, 65%, 70%, 75%, 80%, 85%, 90%, 95% or 100% identity, determined by a global alignment method, with the complementary sequence of the antisense RNA sequence. This partial or full complementarity enables sequence SC1 of the first DNA strand to be hybridized to a first antisense RNA, and sequence SC2 of the second DNA strand to be hybridized to the second antisense RNA. Preferably SC1 and SC2 are identical, which facilitates preparation of the htiRNA hybrid.

Percentage identity can be determined with a global alignment method using the Clustal Omega programme for example (Sievers F et al. (2011). Molecular Systems Biology 7:539 doi:10.1038/msb.2011.75; Sievers F, Higgins D G (2018). Protein Sci 27:135-145).

Figure 2:
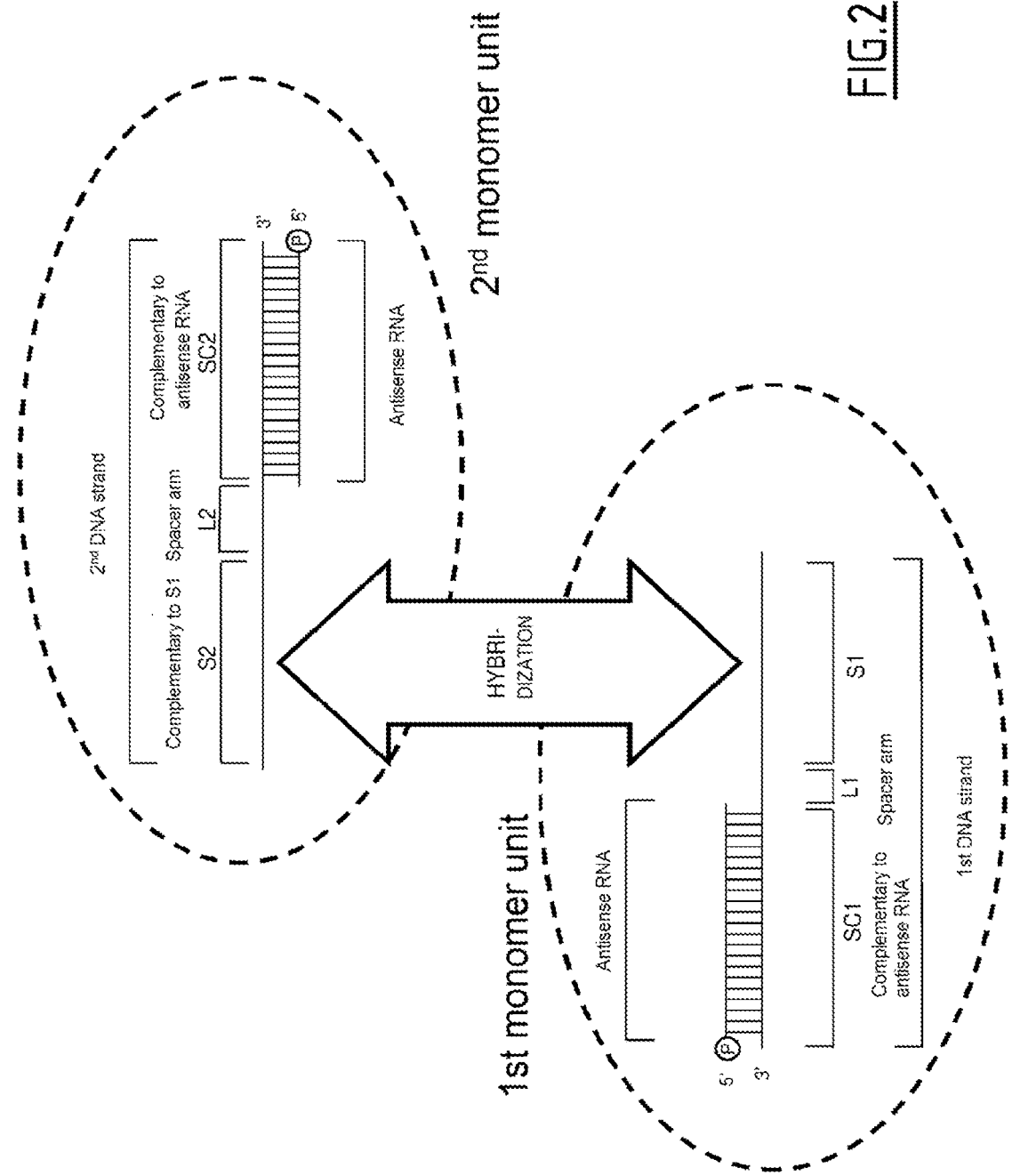

The nucleotide sequence S1 of the first DNA strand and the nucleotide sequence S2 of the second DNA strand are complementary to each other and allow the association via hybridization of the two monomer units in the form of an inverted tandem as illustrated in [FIG. 2] FIG. 2.

Preferably, the nucleotide sequence S1-L1 of the first DNA strand and/or the nucleotide sequence S2-L2 of the second DNA strand have less than 80%, in particular less than 60%, in particular less than 50%, typically less than 40%, in particular less than 30%, preferably less than 20% identity with an RNA sequence of the transcriptome (preferably the human transcriptome), determined by a local alignment method. The nucleotide sequences S1 and S2 preferably do not have a biological role to prevent an adverse effect. The role of the nucleotide sequences S1-L1 and S2-L2 is to increase the total net charge of the htiRNA hybrid and thereby improve the stability of the htiRNA hybrid/nanoparticle complex.

Percentage identity can be determined with a local alignment method using the Nucleotide BLAST programme for example by NCBI (National Center for Biotechnology Information).

As reference transcriptome, particular reference is made to the human transcriptome generated by the Genome Reference Consortium, in particular the version GRCh38.p12 of 21 Dec. 2017.

Since the nucleotide sequences S1 and S2 are complementary, they have the same number $n_{S1-S2}$ of nucleotides. $n_{S1-S2}$ is an integer of 16 to 30. The higher $n_{S1-S2}$ the stronger the hybridization between the two monomer units of the htiRNA hybrid, and the more the total net charge of the htiRNA hybrid increases, and hence the capacity thereof to stabilize a htiRNA hybrid/nanoparticle complex, but the more the risk increases of S1 or S2 having an adverse biological effect. This is why $n_{S1-S2}$ is less than or equal to 30. When $n_{S1-S2}$ is lower than 16, the two monomer units show lesser hybridization. A number $n_{S1-S2}$ of between 18 and 22 is optimal to obtain good hybridization between the two monomer units of the htiRNA hybrid whilst minimising the risk of an adverse biological effect.

Th two antisense RNA strands are identical and each comprises 21 to 23 nucleotides. The 5' end thereof is phosphorylated to allow binding with the protein complex involved in the RNA interference process (RISC complex). The antisense RNA is able to modulate the endogenous mechanisms of RNA interference and hence able to block the expression of a target gene by RNA interference.

The nucleotide spacer arm L1 is used to link nucleotide sequence S1 and nucleotide sequence SC1 of the first DNA strand. The nucleotide spacer arm L2 is used to link nucleotide sequence S2 and nucleotide sequence SC2 of the second DNA strand. The two spacer arms may comprise the same or a different number of nucleotides $n_{L1}$ and $n_{L2}$. When $n_{L1}$ and $n_{L2}$ are the same, the sequences of the nucleotide spacer arms L1 and L2 can be the same or different. $n_{L1}$ and $n_{L2}$ are independently an integer of 1 to 15, in particular of 2 to 10, for example 5. The higher $n_{L1}$ or $n_{L2}$, the more the risk increases of the nucleotide spacer arms L1 or L2 having an adverse biological effect. This is why $n_{L1}$ and $n_{L2}$ are less than or equal to 15, and are preferably as low as possible.

One or both antisense RNA strands, the first DNA strand and/or the second DNA strand can optionally carry one or more lipid groups. These lipid groups advantageously allow the htiRNA hybrid to be made more lipophilic, facilitating the passing thereof across the plasma membranes or reinforcing its affinity for a lipid nanoparticle. A cholesterol group can be used as lipid group. Preferably, the lipid group is grafted on the first and/or second DNA strand, for example onto their 3' end.

Figure 3:
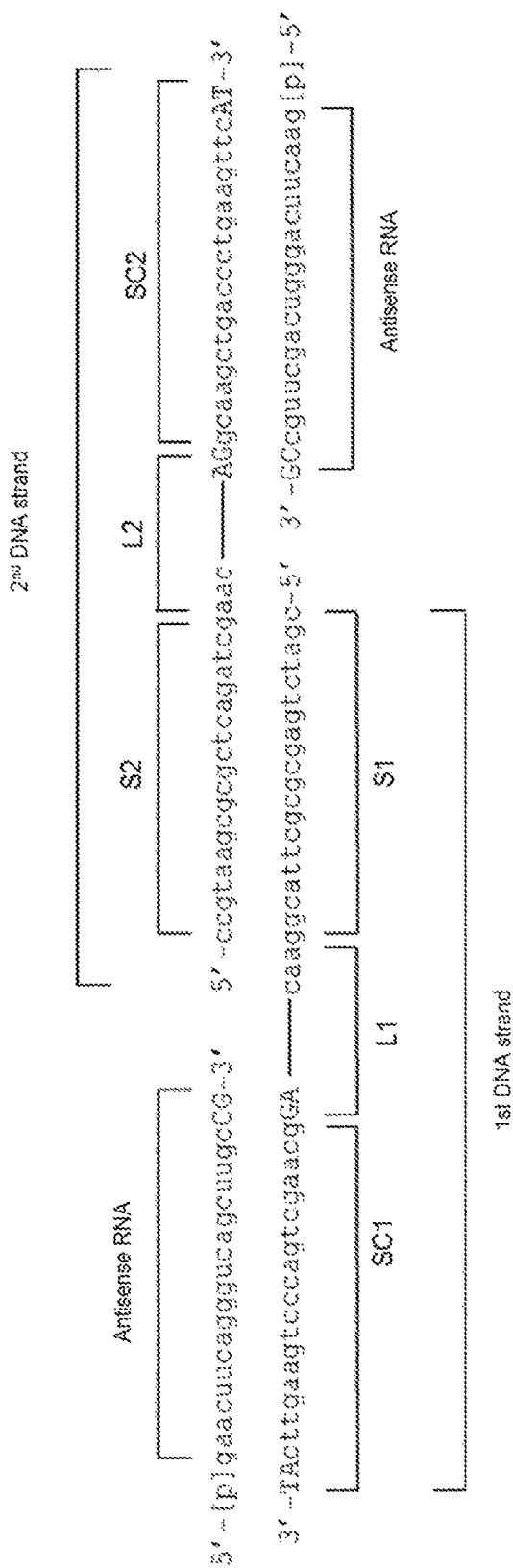

FIG. 3 [FIG. 3] gives an example of a htiRNA hybrid called «htiGFP» since the antisense RNA it contains is an interfering RNA targeting the messenger RNA of the gene coding for the Green Fluorescent Protein (GFP). The 1st DNA strand has the sequence SEQ ID NO:1. The $2^{nd}$ DNA strand has the sequence SEQ ID NO:2. Each of the two antisense RNA strands comprises the sequence SEQ ID NO:3. Each contains $n_{RNA}=22$ nucleotides. The nucleotide sequences SC1 of the first DNA strand and SC2 of the second DNA strand are identical and each consists of the sequence SEQ ID NO:4. The nucleotide sequences SC1 and SC2 each contain $n_{SC1}=n_{SC2}=22$ nucleotides, in which 20 consecutive nucleotides are complementary to 20 consecutive nucleotides of SEQ ID NO:3. The two AT nucleotides of SEQ ID NO:4 represent a 3' sticky end of SC1 et SC2, these two nucleotides not having complementary nucleotides in the antisense RNA. Similarly, two CG nucleotides of SEQ ID NO:3 represent a 3' sticky end of the antisense RNA. The spacer arm L1 and the spacer arm L2 are identical each consisting of the sequence AACAG. The spacer arms L1 and L2 each contain $n_{L1}=n_{L2}=5$ nucleotides. The nucleotide sequence S1 of the first DNA strand consists of sequence SEQ ID NO:5. The nucleotide sequence S2 of the second DNA strand consists of the sequence SEQ ID NO:6. The nucleotide sequences S1 and S2 are complementary. The number of nucleotides of each nucleotide sequence S1 and S2 is $n_{S1-S2}=20$.

Preferably, the sum $n_{SC1}+n_{L1}+n_{S1}+n_{RNA}$ and/or the sum $n_{SC2}+n_{L2}+n_{S2}+n_{RNA}$ are higher than or equal to 60 for optimal stabilization of the htiRNA hybrid/nanoparticle complex.

The htiRNA hybrid can be prepared by hybridization in a hybridization buffer of two molar equivalents of antisense RNA, one molar equivalent of first DNA strand and one molar equivalent of second DNA strand.

A second subject of the invention concerns a complex of at least one nanoparticle and at least one htiRNA hybrid such as defined above. This complex is also called «htiRNA hybrid/nanoparticle complex». In general, a nanoparticle is complexed with several htiRNA hybrids.

The nanoparticle can be a neutral, anionic or cationic nanoparticle, preferably cationic, which promotes electrostatic interactions with the htiRNA hybrid.

The nanoparticle is preferably synthetic. The use of a synthetic nanoparticle allows manipulations with few restrictions compared with manipulations using microorganisms or viruses.

In some embodiments, said nanoparticle is an inorganic nanoparticle, e.g. a gold nanoparticle, magnetic nanoparticle (iron oxide nanoparticle) or a nanocrystal of semiconductor material (quantum dot).

In some embodiments, said nanoparticle is an organic nanoparticle. Examples of nanoparticles able to be used are described in particular in Morille et al., 2008, Biomaterials, 29:3477-3496; Bruno, 2011, Advanced Drug Delivery Reviews, 63:1210-1226; Zhang et al., 2012, Bioorganic Chemistry, 40:10-18.

In some embodiments, said nanoparticle is a hybrid organic/inorganic nanoparticle, typically a nanoparticle having an inorganic core coated with an organic layer in particular a polymeric layer.

In one embodiment, the nanoparticle is an organic nanoparticle comprising at least one polymer. Examples of polymers are Polyethyleneimine (PEI), poly(L-lysine) (PLL), poly(α-[4-amino-butyl]L-glycolic acid), chitosan such as galactosylated chitosan, galactosylated chitosan-graft-poly(vinylpyrrolidone) (PVP), trimethylated chitosan oligomers, N-dodecyl chitosan, deoxycholic acid-modified chitosan, poly(amidoamine) (PAMAM), poly(lactic acid) (PLA), poly(lactic-co-glycolic acid (PLGA), polyalkylcyanoacrylate (PACA), derivatives of cyanoacrylate such as polybutylcyanoacrylate (PBCA), polyisobutylcyanoacrylate (PIBCA), polyisohexylcyanoacrylate (PIHCA), polyhexylcyanoacrylate (PHCA), or isobutylcyanoacrylate (IBCA). Optionally, said nanoparticle may also comprise at least one poly(ethylene-glycol) (PEG).

In one embodiment, the nanoparticle is a cationic organic nanoparticle comprising at least one lipid. For example, the cationic organic nanoparticle comprising at least one lipid is a liposome, or a droplet of a nanoemulsion comprising a continuous aqueous phase and at least one dispersed lipid phase.

Preferably, said liposome comprises or consists of at least one monovalent aliphatic lipid such as 1,2-dioleyl-3-trimethylamonium-propane (DOTAP), N[1-(2,3-dioleyloxy)propyl]-N,N,N-trimethylammonium (DOTMA), or N-(2-hydroxyethyl)-N,N-dimethyl-2,3-bis(tetradecyloxy-1-propananium) (DMRIE); a multivalent aliphatic lipid such as dioctadecylamidoglycylspermine (DOGS), or a cationic derivative of cholesterol such as 3β-[N-(N',N'-dimethylaminoethane)-carbamoyl]cholesterol (DC-Chol) or bis-guanidium-tren-cholesterol (BGTC). Optionally, said liposome may also comprise a helper lipid able to facilitate cytosolic release by de-stabilizing the endosomal membrane, such as dioleylphosphatidylethanolamine (DOPE) or cholesterol. Said liposome may comprise at least 2, 3, 4, 5 lipids such as described above. As nonlimiting examples, said liposome can therefore be a DOTMA/DOPE or DOTAP/cholesterol liposome. Optionally, said liposome may also comprise at least one polyethylene-glycol (PEG). Examples of liposomes also containing at least one PEG are liposomes composed of N,N-dioleyl-N,N-dimethylammonium chloride, DOPE and PEG ceramide conjugates; liposomes composed of 3-N-[methoxypoly(ethyleneglycol)$_{2000}$)carbamoyl]-1,2dimyristoyloxy-propylamine (PEG-C-DMA), 1,2-dilinoleylloxy-N-N-dimethyl-3-aminopropane (DLin DMA), 1,2-distearoyl-sn-glycero-3-phosphocholine (DSPC) and cholesterol in a ratio of 2:40:10:48 mole percent; liposomes composed of β-L-arginyl-2,3-L-diaminopropionic acid-N-palmityl-N-oleyl-amide trihydrochloride, 1,2-diphytanoyl-sn-glycero-3-phosphoethanolamine (DphyPE) and the PEGylated lipid N-(carbonyl methyxypolyethyleneglycol-2000)-1,2-distearoyl-sn-glycero-3-phospho-ethanolamine sodium (DSPE-PEG); liposomes composed of phosphatidylcholine (soybean, hydrogenated), cholesterol, DSPE-PEG2000 and DOTAP.

Preferably, said droplet of a nanoemulsion comprising a continuous aqueous phase and at least one dispersed phase is such as defined in application FR 2 994 849. This embodiment is particularly preferred and is detailed below.

The htiRNA hybrid/nanoparticle complex is then in the form of a nanoemulsion comprising a continuous aqueous phase and at least one dispersed phase which comprises:
a) at least 5 mole % of amphiphilic lipid;
b) 15 to 70 mole % of at least one cationic surfactant comprising:
 i) at least one lipophilic group selected from among:
  a group R or R—(C═O)—, where R is a linear hydrocarbon chain having 11 to 23 carbon atoms,
  a fatty acid ester or amide comprising 12 to 24 carbon atoms and phosphatidylethanolamine, and
  a poly(propylene oxide); and
 ii) at least one hydrophilic group comprising at least one cationic group selected from among:

a linear or branched alkyl group having 1 to 12 carbon atoms and interrupted and/or substituted by at least one cationic group, and;

a polymeric hydrophilic group comprising at least one cationic group, and c) 10 to 55 mole % of a co-surfactant comprising at least one poly(ethylene oxide) chain comprising at least 25 ethylene oxide units;

d) a solubilizing lipid comprising at least one fatty acid glyceride;

e) optionally a helper lipid;

f) a htiRNA hybrid such as defined above, wherein the molar percentages of amphiphilic lipid, cationic surfactant and co-surfactant are relative to the whole (amphiphilic lipid/cationic surfactant (co-surfactant/optional helper lipid).

As explained below, the: amphiphilic lipid/cationic surfactant/co-surfactant/optional helper lipid/htiRNA hybrid are the main components of the shell of the nanoemulsion droplets.

The nanoemulsion is therefore an emulsion of oil-in-water type. It can be single or multiple-phase in particular by having a second aqueous phase in the dispersed phase. Preferably it is single-phase.

One or more htiRNA hybrids (in general several) are complexed on the surface of the droplets of said nanoemulsion.

Cationic Surfactant

The nanoemulsion used comprises a cationic surfactant comprising:

a) at least one lipophilic group selected from among:

i) a group IR representing a linear hydrocarbon chain having 11 to 23 carbon atoms, ii) a fatty acid ester or amide comprising 12 to 24 carbon atoms and phosphatidylethanolamine, such as distearyl phosphatidylethanolamine (DSPE), and iii) poly(propylene oxide); and b) at least one hydrophilic group comprising at least one cationic group selected from among:

i) a linear or branched alkyl group having 1 to 12 carbon atoms and interrupted and/or substituted by at least one cationic group, and ii) a polymeric hydrophilic group comprising at least one cationic group, said polymeric group being selected in particular from among:

a poly(ethylene oxide) typically comprising 3 to 500 ethylene oxide units, preferably 20 to 200 ethylene oxide units, and comprising at least one cationic group, a polysaccharide such as dextran, cellulose or chitosan, particularly having molecular weights of between 0.5 and 20 kDa, e.g. between 1 and 12 kDa, a polyamine such as a chitosan or polylysine, particularly having molecular weights of between 0.5 and 20 kDa, e.g. between 1 and 12 kDa.

By «fatty acid ester or amide comprising 12 to 24 carbon atoms and phosphatidylethanolamine», it is meant a group of formula:

[Chem 1]

where:

$R_3$ and $R_4$ are independently a linear hydrocarbon chain having 11 to 23 carbon atoms, $A_3$ and $A_4$ are O or NH, and M is H or a cation.

The cationic groups of the cationic surfactant are typically:

oniums selected from among ammonium, imidazolium, pyridinium, pyrrolidinium, piperidinium, phosphonium or sulfonium groups, or metal complexes between a radical of a mono- or multidentate organic chelating group e.g. phenanthroline, pyridine, ethylenediaminetetraacetic acid (EDTA), diethylenetriaminepentaacetic acid (DTPA), porphyrins, phthalocyanines, chlorins, bacteriochlorins complexed with an inorganic cation such as $Ca^{2+}$, $Al^{3+}$, $Ni^+$, $Zn^{2+}$, $Fe^{2+}$, $Fe^{3+}$ or $Cu^{2+}$, the ammonium groups notably $—^+NMe_3$, $—^+NHMe_2$, $—^+NH_2Me$ and $—^+NH_3$, in particular $—^+NH_3$, being particularly preferred.

Evidently, anions can be associated with the cationic groups so that the nanoemulsion is electrically neutral. The type of anion is unlimited. As an illustration, mention can be made of halides, in particular chloride or bromide, trifluoroacetate.

In the cationic surfactant, the type of linkage group linking the lipophilic group(s) to the hydrophilic group(s) comprising at least one cationic group is not limited. Examples of linkage groups are given below (group L)

The cationic surfactant can have the following formula (A):

$$[(Lipo)_l\text{-}L\text{-}(Hydro)_h]^{n+}, (n/m)[A]^{m-} \qquad (A)$$

where:

l and h are independently integers of between 1 and 4, n is an integer higher than or equal to 1, generally between 1 and 50, Lipo is a lipophilic group such as defined above, Hydro is a hydrophilic group such as defined above comprising at least one cationic group, L is a linkage group, A is an anion, m is an integer representing the anion charge, n is an integer representing the cation charge $[(Lipo)_l\text{-}L\text{-}(Hydro)_h]$.

In above-mentioned formula (A), preferably L is such that:

a) when l and h are 1, L is a divalent linkage group selected from among:

a single bond, a group Z selected from among —O—, —NH—, —O(OC)—, —(CO)O—, —(CO)NH—, —NH(CO)—, O—O—(CO)—O—, —NH—(CO)—O—, —O—(CO)—NH— et —NH—(CO)—NH, —O—PO(OH)—O— or a cyclic divalent radical of 5 to 6 atoms, a group Alk being an alkylene having 1 to 6 carbon atoms, and a group Z-Alk, Alk-Z, Alk-Z-Alk or Z-Alk-Z where Alk and Z are such as defined above and where the two Z groups of the Z-Alk-Z group are the same or different, b) when one of the groups l or h is 1, and the other is 2, L is a trivalent group selected from among a phosphate group OP—(O—)$_3$, a glycerol-derived group of formula —O—CH$_2$—CH—(O—)CH$_2$—O—, and a cyclic trivalent radical of 5 to 6 atoms, for the other values of l and h, L is a cyclic multivalent radical of 5 to 6 atoms.

In particularly preferred manner, L is such that:

a) when l and h are 1, L is a divalent linkage group selected from among:
a single bond,
a group Z selected from among —O—, —NH—, —O(OC)—, —(CO)O—, —(CO)NH—, —NH(CO)—, —O—(CO)—O—, —NH—(CO)—O—, —O—(CO)—NH— and —NH—(CO)—NH or —O—PO(OH)—O—, b) when one of the groups l or h is 1, and the other is 2, L is a trivalent group selected from among phosphate group OP—(O—)$_3$ and a glycerol-derived group of formula —O—CH$_2$—CH—(O—)CH$_2$—O—.

In above-mentioned formula (A), preferably l and h are each independently 1 or 2.

In a first alternative, the hydrophilic group of the cationic surfactant is a linear or branched alkyl group having 1 to 12 carbon atoms and interrupted and/or substituted by at least one cationic group. As examples of such cationic surfactants, the following can be cited:

1) (Lipo)-(CH$_2$)$_{m1}$—NR$_{30}$R$_{31}$R$_{32}$, where Lipo is a lipophilic group such as defined above, m1 is 1 or 2, and R$_{30}$, R$_{31}$ and R$_{32}$ are independently H, Me or —CH$_2$—CH$_2$—OH, 2) [Chem 2]

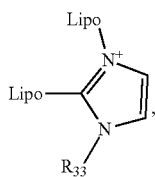

where each Lipo is independently a lipophilic group such as defined above, and R33 is H, Me or —CH$_2$—CH$_2$—OH, 3) [Chem 3]

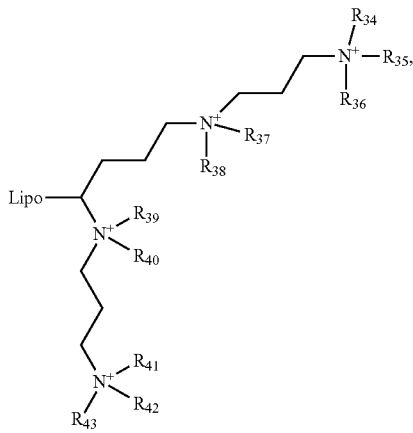

where Lipo is a lipophilic group such as defined above, and R$_{34}$, R$_{35}$, R$_{36}$, R$_{37}$, R$_{38}$, R$_{39}$, R$_{40}$, R$_{41}$, R$_{42}$ and R$_{43}$ are independently H, Me or —CH$_2$—CH$_2$—OH.

Preferably, the cationic surfactant is selected from among:

N[1-(2,3-dioleyloxy) propyl]-N,N,N-trimethylammonium (DOTMA), 1,2-dioleyl-3-trimethylamonium-propane (DOTAP), N-(2-hydroxyethyl)-N,N-dimethyl-2,3-bis(tetradecyloxy-1-propananium) (DMRIE), 1-[2-(oleoyloxy)ethyl]-2-oleyl-3-(2-hydroxyethyl)imidazolinium (DOTIM), and dioctadecylamidoglycylspermine (DOGS) (in protonated form), and is preferably 1,2-dioleyl-3-trimethylamonium-propane (DOTAP).

According to a second alternative, the hydrophilic group of the cationic surfactant is a polymeric hydrophilic group comprising at least one cationic group.

When the hydrophilic group of the cationic surfactant is polymeric, the cationic group(s) can be an end or pendant group or groups. For example:

when the polymeric hydrophilic group is a poly(ethylene oxide), the cationic group(s) are generally positioned on an end group at the end of the poly(ethylene oxide) chain.

when the polymeric hydrophilic group is dextran or cellulose, the cationic group(s) are generally positioned on an end group at the end of the polysaccharide chain.

when the polymeric hydrophilic group is chitosan, the cationic group(s) are generally a pendant group, in particular —NH$_3^+$ groups present in an acid medium on chitosan.

In one embodiment, the cationic group(s) are end group(s). Pendant groups of adjacent anionic surfactants on the surface of the droplets of the dispersed phase repel each other via electrostatic interactions, and as a result nanoemulsions comprising cationic surfactants in which the Hydro group comprises pendant groups are generally less stable.

In another embodiment, the cationic group(s) are pendant group(s). It is advantageously possible to use a cationic surfactant in which the hydrophilic group comprises several pendant cationic groups, and hence to obtain a nanoemulsion that is more positively charged and therefore in which the htiRNA hybrid is more strongly complexed to the droplets.

The preferred polymeric hydrophilic group is a radical of a poly(ethylene oxide) typically comprising 3 to 500 ethylene oxide units, preferably 20 to 200 ethylene oxide units, and comprising at least one cationic group.

Therefore, in one embodiment, the cationic surfactant has one of the following formulas:

[Chem 4]

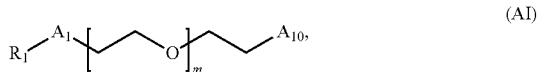 (AI)

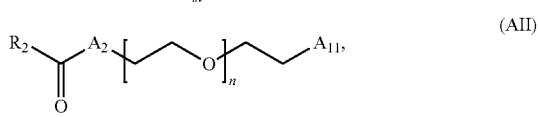 (AII)

-continued

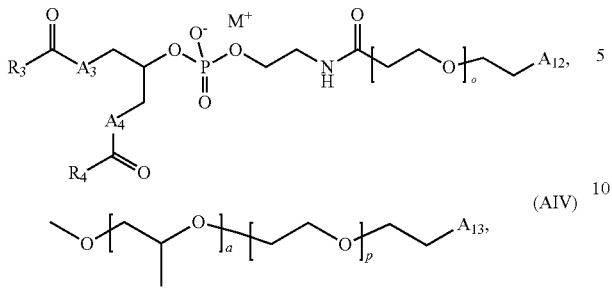

(AIII)

(AIV)

where:
R$_1$, R$_2$, R$_3$ and R$_4$ are independently a linear hydrocarbon chain having 11 to 23 carbon atoms,
A$_1$, A$_2$, A$_3$ et A$_4$ are O or NH,
m, n, o and p are independently integers of 3 to 500, preferably 20 to 200, and
a is an integer of 20 to 120,
M is H or a cation,
A$_{10}$, A$_{11}$, A$_{12}$ and A$_{13}$ are independently a group —$^+$NR$_{20}$R$_{21}$R$_{22}$, where R$_{20}$, R$_{21}$ and R$_{22}$ are independently H, Me or —CH$_2$—CH$_2$—OH.

In one embodiment, in formula (AII), A$_{11}$ is —$^+$NH$_3$ and the cationic surfactant has the following formula:

[Chem 5]

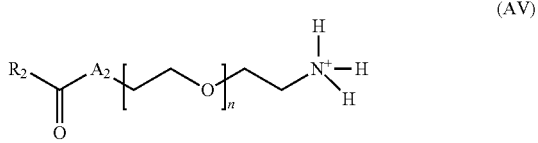

(AV)

where A$_2$, R$_2$ and n are such as defined above. Preferably, in formula (AII), R$_2$ is C$_{17}$H$_{35}$.

Without wishing to be bound by any particular theory, the presence of the polymeric hydrophilic group appears to allow:
stabilization of the nanoemulsion, and
protection of the htiRNA, located on the surface of the droplets, against the proteins of the medium in which the nanoemulsion is administered/used, and hence against degradation of the htiRNA hybrid and antisense RNA contained therein, by these proteins.

According to a third alternative, the nanoemulsion comprises at least two cationic surfactants, of which:
a) one is selected from among:
  N[1-(2,3-dioleyloxy) propyl]-N,N,N-trimethylammonium (DOTMA),
  1,2-dioleyl-3-trimethylamonium-propane (DOTAP),
  N-(2-hydroxyethyl)-N,N-dimethyl-2,3-bis(tetradecyloxy-1-propananium) (DMRIE),
  1-[2-(oleoyloxy)ethyl]-2-oleyl-3-(2-hydroxyethyl)imidazolinium chloride (DOTIM), and
  dioctadecylamidoglycylspermine (DOGS),
  and is preferably 1,2-dioleyl-3-trimethylammonium-propane (DOTAP); and
b) the other is a cationic surfactant comprising:
  i) at least one lipophilic group selected from among:
    a group R or R—(C=O)—, where R is a linear hydrocarbon chain having 11 to 23 carbon atoms,
    a fatty acid ester or amide comprising 12 to 24 carbon atoms and phosphatidylethanolamine, such as distearyl phosphatidylethanolamine (DSPE), and
    a poly(propylene oxide), and
  ii) a polymeric hydrophilic group comprising at least one cationic group, said polymeric group being selected from among:
    a poly(ethylene oxide) typically comprising 3 to 500 ethylene oxide units, preferably 20 to 200 ethylene oxide units, and comprising at least one cationic group,
    a polysaccharide, such as dextran, cellulose or chitosan,
    a polyamine such as a chitosan or polylysine,
  and is preferably a poly(ethylene oxide) comprising at least one cationic group.

In one embodiment the nanoemulsion, as cationic surfactants, comprises:
a) 1,2-dioleyl-3-trimethylammonium-propane, and
b) a cationic surfactant comprising:
  i) at least one lipophilic group selected from among:
    a group R or R—(C=O)—, where R is a linear hydrocarbon chain having 11 to 23 carbon atoms,
    a fatty acid ester or amide comprising 12 to 24 carbon atoms and phosphatidylethanolamine such as distearyl phosphatidylethanolamine (DSPE), and
  ii) a poly(ethylene oxide) typically comprising 3 to 500 ethylene oxide units, preferably 20 to 200 ethylene oxide units, and comprising at least one cationic group.

In one embodiment the nanoemulsion, as cationic surfactants, comprises:
1,2-dioleyl-3-trimethylammonium-propane, and
a compound of formula (All) such as defined above, in particular of formula (AV).

The cationic surfactant is located in the shell of the nanoemulsion droplets. It is bound via electrostatic interactions to the htiARN hybrid enabling it to be held on the surface of the droplets. It is these electrostatic interactions which allow the formation and stability of the complex formed by the htiRNA hybrid/nanoemulsion droplets.

The nanoemulsion comprises 15 to 70 mole % of at least one cationic surfactant relative to the whole (amphiphilic lipid/cationic surfactant/co-surfactant/optional helper lipid). Below 15%, the nanoemulsion does not comprise sufficient positive charges and complexing of the droplets with the htiRNA hybrid is insufficient. Above 70%, the nanoemulsions are not stable and generally cannot even be formulated (the formation of the nanoemulsion is not possible since the droplets coalesce to form two phases), and the droplets generally become toxic for the cells.

These proportions are particularly adapted to obtain efficient complexing of the htiRNA hybrid on the surface of the droplets, and hence good delivery and/or transfection.

Helper Lipid

The nanoemulsion may comprise a helper lipid able to facilitate cytosolic release by destabilizing the endosomal membrane. Preferably, this lipid is dioleylphosphatidylethanolamine (DOPE).

The helper lipid promotes endosomal escape of the nanoemulsion droplets, and hence of the htiRNA hybrid they contain, and generally improves their efficiency. Therefore, the helper lipid improves the gene silencing efficiency of the htiRNA hybrid.

The lipid able to facilitate cytosolic release by destabilizing the endosomal membrane is located in the shell of the nanoemulsion droplets.

Amphiphilic Lipid

The nanoemulsion comprises at least one amphiphilic lipid located in the shell of the nanoemulsion droplets.

To form a stable nanoemulsion, it is necessary to include in the composition at least one amphiphilic lipid as surfactant. The amphiphilic nature of the surfactant ensures stabilization of the oil droplets within the continuous aqueous phase. Below 5 mole % of amphiphilic lipid relative to the whole (amphiphilic lipid/cationic surfactant/co-surfactant/optional helper lipid), nanoemulsions are not stable and generally cannot even be formulated (formation of the nanoemulsion is not possible since the droplets coalesce to form two phases).

In general, the nanoemulsion comprises 5 to 85 mole %, preferably 5 to 75 mole %, in particular 5 to 50 mole % and more particularly 8 to 30 mole % of amphiphilic lipid relative to the whole (amphiphilic lipid/cationic surfactant/co-surfactant/optional helper lipid).

The quantity of amphiphilic lipid advantageously contributes towards controlling the size of the dispersed phase of the nanoemulsion.

Amphiphilic lipids comprise a hydrophilic portion and a lipophilic portion. They are generally selected from among compounds in which the lipophilic portion comprises a linear or branched, saturated or unsaturated chain having 8 to 30 carbon atoms. They can be selected from among phospholipids, cholesterols, lysolipids, sphingomyelins, tocopherols, glucolipids, stearylamines, cardiolipins of natural or synthetic origin; molecules composed of a fatty acid coupled to a hydrophilic group via an ether or ester function such as sorbitan esters e.g. sorbitan monooleate and monolaurate sold under the trade names Span® by Sigma; polymerized lipids; lipids conjugated with short chains of polyethylene oxide (PEG) such as the non-ionic surfactants sold under the trade names Tween® by ICI Americas, Inc., and Triton® by Union Carbide Corp.; sugar esters such as sucrose mono- and di-laurate, mono- and di-palmitate, mono- and distearate; said surfactants able to be used alone or in mixtures.

Phospholipids are the preferred amphiphilic lipids.

Lecithin is the particularly preferred amphiphilic lipid.

Solubilizing Lipid

The nanoemulsion further comprises a solubilizing lipid comprising at least one fatty acid glyceride, located in the dispersed phase of the nanoemulsion, more specifically in the core of the droplets. The main function of this compound is to solubilize the amphiphilic lipid that is scarcely soluble in the dispersed phase of the nanoemulsion.

The solubilizing lipid is a lipid having sufficient affinity with the amphiphilic lipid to allow solubilizing thereof. Preferably, the solubilizing lipid is solid at ambient temperature (25° C.).

If the amphiphilic lipid is a phospholipid, these can particularly be:
fatty acid and fatty alcohol esters, such as cetyl palmitate, or
derivatives of glycerol and in particular glycerides obtained by esterification of glycerol with fatty acids.

The solubilizing lipid used is advantageously selected as a function of the amphiphilic lipid used. It generally has a close chemical structure to ensure the desired solubilization. It can be an oil or a wax. Preferably the solubilizing lipid is solid at ambient temperature (20° C.), but liquid at body temperature (37° C.).

The preferred solubilizing lipids, in particular for phospholipids, are the esters of fatty acids and fatty alcohols such as cetyl palmitate, or the glycerides of fatty acids in particular of saturated fatty acids and in particular the glycerides of saturated fatty acids having 8 to 18 carbon atoms, more preferably 12 to 18 carbon atoms. Advantageously, the solubilizing lipids is a mixture of different glycerides.

Preferably the solubilizing lipid is a mixture of glycerides of saturated fatty acids comprising at least 10 weight % of C12 fatty acids, at least 5 weight % of C14 fatty acids, at least 5 weight % of C16 fatty acids and at least 5 weight % of C18 fatty acids.

Preferably, the solubilizing lipid is a mixture of glycerides of saturated fatty acids comprising 0 to 20 weight % of C8 fatty acids, 0 to 20 weight % of C10 fatty acids, 10 to 70 weight % of C12 fatty acids, 5 to 30 weight % of C14 fatty acids, 5 to 30 weight % of C16 fatty acids, and 5 to 30 weight % of C18 fatty acids.

Particularly preferred are mixtures of semi-synthetic glycerides solid at ambient temperature (25° C.) sold under the trade name Suppocire®NC by Gattefossé and approved human injection. N-type Suppocire® products are obtained by direct esterification of fatty acids and glycerol. These are hemi-synthetic glycerides of C8 to C18 saturated fatty acids, the quali-quantitative composition of which is given in Table 1 below.

The aforementioned solubilizing lipids allow an advantageously stable nanoemulsion to be obtained. Without wishing to be bound by any particular theory, it is assumed that the aforementioned solubilizing lipids allow droplets to be obtained in the nanoemulsion which have an amorphous core. The core thus obtained has high internal viscosity without exhibiting any crystallinity however. Crystallization is harmful for the stability of the nanoemulsion since it generally leads to aggregation of the droplets and/or to expulsion of the encapsulated molecules from the droplets. These physical properties promote the physical stability of the nanoemulsion.

The quantity of solubilizing lipid can vary widely as a function of the type and quantity of amphiphilic lipid contained in the dispersed phase. In general, the core of the droplets (comprising the solubilizing lipid, optional oil, optional imaging agent, optional therapeutic agent if lipophilic) comprises 1 to 100 weight %, preferably 5 to 80 weight % and more particularly 40 to 75 weight % of solubilizing lipid.

TABLE 1

Fatty acid composition of Suppocire ® NC by Gattefossé

| Chain length | [Weight %] |
|---|---|
| C8 | 0.1 to 0.9 |
| C10 | 0.1 to 0.9 |
| C12 | 25 to 50 |
| C14 | 10 to 24.9 |
| C16 | 10 to 24.9 |
| C18 | 10 to 24.9 |

Oil

The dispersed phase of the nanoemulsion may further comprise one or more other oils located in the core of the droplets.

The oils used preferably have a hydrophilic-lipophilic balance (HLB) of less than 8 and more preferably of between 3 and 6. Advantageously the oils are used without chemical or physical modification prior to formation of the emulsion.

The oils are generally selected from among biocompatible oils, in particular from among oils of natural origin (vegetable or animal) or synthetic. Among said oils particular mention can be made of oils of natural vegetable origin, particularly including soybean, flax, palm, groundnut, olive, grapeseed and sunflower seed oils; synthetic oils particularly including triglycerides, diglycerides and monoglycerides. These oils can be first-pressed, refined or inter-esterified.

The preferred oils are soybean oil and flax oil.

In general, if present, the oil is contained within the core of the droplets (comprising the solubilizing lipid, optional oil, optional imaging agent, optional therapeutic agent if lipophilic) in a proportion of 1 to 80 weight %, preferably between 5 and 50 weight % and more particularly 10 to 30 weight %).

The dispersed phase may also contain other additives such as colouring agents, stabilizers, preserving agents or other active ingredients in suitable amount.

Co-surfactant

The nanoemulsion comprises a co-surfactant to allow stabilizing thereof.

The co-surfactants are generally water-soluble surfactants. They comprise at least one poly(ethylene oxide) chain comprising at least 25, in particular at least 30, preferably at least 35 ethylene oxide units. The number of ethylene oxide units is generally less than 500.

Nanoemulsions comprising a co-surfactant comprising a poly(ethylene oxide) chain having fewer than 25 ethylene oxide units are not stable. In general, it is not even possible to prepare the nanoemulsion.

These numbers of units are particularly adapted to prevent leakage of the htiRNA hybrid outside the droplets.

The inventors have observed that a nanoemulsion not comprising a co-surfactant is not sufficiently stable.

In addition, without wishing to be bound by any particular theory, the presence of the chain composed of ethylene oxide units of the co-surfactant would appear to protect the htiRNA hybrids located on the surface of the droplets against the proteins of the medium in which the nanoemulsion is administered/used, and hence against degradation of said htiRNA hybrids by these proteins.

As examples of co-surfactants, particular mention can be made of the conjugate compounds polyethyleneglycol/phosphatidyl-ethanolamine (PEG-PE), ethers of fatty acid and polyethyleneglycol such as the products sold under the trade names Brij® (e.g. Brij® 35, 58, 78 or 98) by ICI Americas Inc., esters of fatty acid and polyethyleneglycol such as the products sold under the trade names Myrj® by ICI Americas Inc. (e.g. Myrj® 45, 52, 53 or 59) and block copolymers of ethylene oxide and propylene oxide such as the products sold under the trade names Pluronic® by BASF AG (e.g. Pluronic® F68, F127, L64, L61, 10R4, 17R2, 17R4, 25R2 or 25R4) or the products sold under the trade name Synperonic® by Unichema Chemie BV (e.g. Synperonic® PE/F68, PE/L61 or PE/L64).

Therefore, the co-surfactant is located both in the continuous aqueous phase and in the dispersed phase. The hydrophobic portion of the co-surfactant enters the droplets of the dispersed phase, whereas the polyalkoxylated chains lie in the continuous aqueous phase. In the present application, the described weight percentages of the dispersed phase are calculated by considering that the co-surfactant belongs to the dispersed phase.

The nanoemulsion comprises 10 to 55 mole % of co-surfactant relative to the whole (amphiphilic lipid/cationic surfactant/co-surfactant/optional helper lipid). Below 10%, the nanoemulsions are not stable and generally cannot even be formulated (formation of the nanoemulsion is not possible since the droplets coalesce to form two phases). Above 55% complexing of the htiRNA hybrids on the droplets of the nanoemulsion does not take place, probably since the positive charges of the cationic surfactant are masked by the poly(ethylene oxide) chains of the co-surfactant and therefore no longer accessible for bonding via electrostatic binding to the htiRNA hybrids.

Imaging Agent

The nanoemulsion may comprise an imaging agent which advantageously allows viewing of the distribution of the droplets in the patient's cells or body, and hence the distribution of the htiRNA hybrids.

The imaging agent can particularly be used in imaging of following types:

Positron Emission Tomography (PET) (the imaging agent possibly being a compound comprising a radionuclide such a $^{18}F$, $^{11}C$, a metal cation chelate $^{68}Ga$, $^{64}Cu$), Single Photon Emission Computed Tomography (SPECT) (the imaging agent possibly being a compound comprising a radionuclide e.g. $^{123}I$, or a chelate of $^{99m}Tc$ or $^{111}In$), Magnetic Resonance Imaging (MRI) (the imaging agent possibly being a gadolinium chelate or magnetic nanocrystal such as a nanocrystal of iron oxide, manganese oxide or iron-platinum FePt), optical imaging or X-ray imaging (the imaging agent possibly being a lipophilic fluorophore or contrast agent e.g. an iodine molecule such as iopamidol, amidotrizoate, or gold nanoparticles).

Preferably, the imaging agent is a lipophilic fluorophore to allow optical imaging.

The type of lipophilic fluorophore(s) used is not critical provided they are compatible with in vivo imaging (i.e. they are biocompatible and non-toxic). Preferably, the fluorophores used as imaging agent absorb and emit in the visible or near infrared range. For non-invasive imaging in a tissue or living organism (animal, man), the preferred fluorophores absorb and emit in the near infrared. So that excitation light and the light emitted by the fluorophore are able to better pass through the tissues, fluorophores need to be used which absorb and emit in the near infrared i.e. at a wavelength of between 640 and 900 nm.

As lipophilic fluorophore, mention can be made for example of the compounds cited in Chapter 13 ("Probes for Lipids and Membranes") of the InVitrogen catalogue. More specifically, as fluorophore mention can be made of Indocyanine Green (ICG), fatty acid analogues and phospholipids functionalized by a fluorescent group such as the fluorescent products sold under the trade names Bodipy® e.g. Bodipy® 665/676 (Ex/Em.); lipophilic derivatives of carbocyanines such as 1,1'-dioctadecyl-3,3,3',3'-tetramethylindodicarbocyanine perchlorate (DiD) sold for example under reference D-307, 3,3'-dihexadecyloxacarbocyanine perchlorate (DiO) sold for example under reference D1125, 1,1'-dihexadecyl-3,3,3',3'-tetramethylindocarbocyanine perchlorate (DiI) sold for example under reference D384; fluorescent probes derived from sphingolipids, steroids or lipopolysaccharides such as the products sold under the trade names BODIPY® TR ceramides, BODIPY® FL C5-lactosylceramide, BODIPY® FL C5-ganglioside, BODIPY® FL cerebrosides; amphiphilic derivatives of cyanines, rhodamines, fluoresceins or coumarins such as octadecyl rhodamine B, octadecyl fluorescein ester and 4-heptadecyl-7-hydroxycoumarin; and diphenylhexatriene (DPH) and derivatives thereof; all these products being sold by Invitrogen.

In one preferred embodiment of the invention, the fluorophore is indocyanine green, 1,1'-dioctadecyl-3,3,3',3'-tetramethylindodicarbocyanine perchlorate, 3,3'-dihexadecyloxacarbocyanine perchlorate, or 1,1'-dihexadecyl-3,3,3',3'-tetramethylindocarbocyanine perchlorate.

Therapeutic Agent

The nanoemulsion may comprise a therapeutic agent.

The therapeutic agents able to be encapsulated in the nanoemulsion particularly comprise active ingredients acting via chemical, biological or physical route. Therefore, these can be pharmaceutical active ingredients or biological agents such as DNA, proteins, peptides or antibodies, or agents useful for physical therapies such as compounds useful for thermotherapy, compounds releasing singlet oxygen when excited by light and useful for phototherapy, and radioactive agents. Preferably they are active ingredients administered via parenteral route.

Depending on its lipophilic or amphiphilic affinity, the therapeutic agent will be encapsulated by the dispersed phase or will be located at the interface of the two phases.

The types of therapeutic agents encapsulated in the nanoemulsion are not particularly limited. However, the nanoemulsion is of particular interest for scarcely soluble compounds which are difficult to formulate in conventional administering systems, and for active ingredients used in phototherapy for which the quantum yield can be maintained.

On account of the mild conditions of the preparation method, the described nanoemulsion is of particular interest for encapsulating therapeutic agents which degrade at high temperature.

Among the pharmaceutical active ingredients of interest as therapeutic agents, particular mention can be made of agents used in the treatment of AIDS, agents used in the treatment of heart disease, analgesics, anaesthetics, anorexigens, anthelminthics, antiallergic, anti-anginal, anti-arrhythmic, anticholinergic agents, anticoagulants, antidepressants, antidiabetics, antidiuretics, antiemetics, anticonvulsants, antifungals, antihistamines, antihypertensives, anti-inflammatories, anti-migraine, antimuscarinic antimycobacterial agents, anticancer agents including anti-Parkinsonian, antithyroid, antiviral agents, astringents, blocking agents, blood products, blood substitutes, cardiac inotropes, cardiovascular agents, central nervous system agents, chelating agents, chemotherapy agents, hematopoietic growth factors, corticosteroids, antitussive agents, dermatological agents, diuretics, dopaminergic agents, elastase inhibitors, endocrine agents, ergot alkaloids, expectorants, gastro-intestinal agents, genital-urinary agents, growth hormone trigger factor, growth hormones, haematological agents, haematopoietic agents, haemostatics, hormones, immunosuppressants, interleukins, interleukin analogues, lipid regulating agents, gonadoliberin, myorelaxants, narcotic antagonists, nutrients, nutritive agents, oncological therapies, organic nitrates, vagomimetic agents, prostaglandins, antibiotics, renal agents, respiratory agents, sedatives, sexual hormones, stimulants, sympathomimetics, systemic anti-infection agents, tacrolimus, thrombolytics, thyroid agents, treatments for attention deficit disorders, vasodilators, xanthins, cholesterol-reducing agents. Particularly targeted are anti-cancer agents such as taxol (paclitaxel), doxorubicin and cisplatin.

Among the physical or chemical agents, particular mention can be made of radioactive isotopes and photosensitizers.

Among photosensitizers, particular mention can be made those belonging to the class of tetrapyrroles such as porphyrins, bacteriochlorins, phthalocyanines, chlorines, purpurins, porphycenes, pheophorbides, or those belonging to the class of texaphyrins or hypericins. Among the first-generation photosensitizers hematoporphyrin can be cited and a mixture of hematoporphyrin derivatives (HpD) (sold under the trade name Photofrin® by Axcan Pharma). Among the second-generation photosensitizers mention can be made of meta-tetra-hydroxyphenyl chlorine (mTHPC; trade name Foscan®, Biolitec AG) and the cycle A monoacid derivative of benzoporphyrin (BPD-MA sold under the trade name Visudyne® by QLT and Novartis Opthalmics). The formulations of the second-generation photosensitizers which associate a molecule (lipid, peptide, sugar etc.) termed a transporter with these photosensitizers allowing their selective conveying towards tumoral tissue are called third-generation photosensitizers.

Among biological agents, oligonucleotides can be mentioned and DNA, RNA, siRNAs, peptides, proteins and saccharides.

Evidently, the therapeutic agent can be formulated directly in its active form or in pro-drug form. Also, it is envisaged that several therapeutic agents are able to be formulated in association in the nanoemulsion.

The quantity of therapeutic agent is dependent on the target application and on the type of agent. However, it will generally be sought to formulate the nanoemulsion with a maximum concentration of therapeutic agent, in particular if these are scarcely soluble therapeutic agents, to limit the volume and/or duration of administration to the patient.

It has been ascertained that the presence of the solubilizing lipid in the dispersed phase allows the incorporation of a large number of compounds even hydrophobic or amphiphilic.

Proportion of Core in the Droplets

In general, the molar proportion of the components of the core of the droplets compared with the components of the droplets is 10 to 80%, in particular 25 to 75%, preferably from 33.35 to 73.99% (these percentages being calculated without taking the htiRNA hybrid into account). In other words, the molar proportion (mol/mol) of the whole (solubilizing lipid/optional oil/optional imaging agent/optional lipophilic therapeutic agent) relative to the dispersed phase (i.e. to all the components of the dispersed phase) is generally 10 to 80%, in particular 25 to 75%, preferably from 33.35 to 73.99%.

In general, the weight proportion (wt/wt) of the components of the core of the droplets relative to the components of the droplets is 10 to 60%, in particular 20 to 60%, preferably from 23.53 to 59.51% (these percentages being calculated without taking the htiRNA hybrid into account). In other words, the weight proportion of the whole (solubilizing lipid/optional oil/optional imaging agent/optional lipophilic therapeutic agent) relative to the dispersed phase (i.e. to all the components of the dispersed phase) is generally 10 to 60%, in particular 20 to 60%, preferably from 23.53 to 59.51%.

These molar and/or weight proportions are particularly adapted so that the nanoemulsion, before complexing with the htiRNA, is stable during storage in particular stable when being stored more than 28 days at 40° C., even more than 300 days at 40° C. Stability can be measured in particular by monitoring the size of the droplets, their polydispersity index and/or zeta potential (for example by Dynamic Light Scattering on apparatus of ZetaSizer type, Malvern).

Aqueous Phase

The aqueous phase of the nanoemulsion is preferably composed of water and/or a buffer such as a phosphate buffer e.g. Phosphate Buffer Saline (PBS) or a saline solution in particular sodium chloride.

The continuous aqueous phase may also comprise a thickening agent such as glycerol, saccharide, oligosaccharide or polysaccharide, a gum or protein, preferably glycerol. The use of a continuous phase of greater viscosity facilitates emulsification and thereby reduces sonication time.

The aqueous phase advantageously comprises 0 to 50% by weight, preferably 1 to 30% by weight and more particularly 5 to 20% by weight of thickening agent.

Evidently, the aqueous phase may also contain other additives such as colouring agents, stabilizers and preserving agents in suitable amount.

The proportion of dispersed phase and aqueous phase varies largely. However, most often the nanoemulsions are prepared with 1 to 50%, preferably 5 to 40%, more particularly 10 to 30% by weight of dispersed phase and 50 to 99%, preferably 60 to 95% and more particularly 70 to 90% by weight of aqueous phase.

Size of Droplets

The droplets of the nanoemulsion before complexing with the htiRNA hybrid(s) (non-complexed droplets) generally have a diameter of between 20 and 200 nm. This diameter can particularly be measured by Dynamic Light Scattering (DLS) on ZetaSizer apparatus, Malvern.

It is possible to obtain droplets of more specific size by adapting the percentages of the nanoemulsion components.

For a nanoemulsion comprising droplets not complexed to a htiRNA hybrid of size between 20 and 40 nm, it is preferred to use a nanoemulsion comprising at least 5 mole % of amphiphilic lipid, and:

25 to 45 mole % of co-surfactant (below 25 mole % the nanoemulsion may exhibit stability problems), and/or 15 to 50 mole % of cationic surfactant.

For a nanoemulsion comprising droplets not complexed to a htiRNA hybrid of size between 40 and 100 nm, it is preferred to use a nanoemulsion comprising at least 5 mole % of amphiphilic lipid, and:
- 45 to 50 mole % of co-surfactant (below 45 mole % the nanoemulsion may exhibit stability problems. Above 50% the nanoemulsion has lesser transfection efficacy), and/or
- 30 to 40 mole % of cationic surfactant (below 30 mole % the nanoemulsion has lesser transfection efficacy. Above 40% the nanoemulsion may exhibit stability problems).

For a nanoemulsion comprising droplets not complexed with a htiRNA hybrid of size between 130 and 175 nm, it is preferred to use a nanoemulsion comprising at least 5 mole % of amphiphilic lipid and 15 to 70 mole % of at least one cationic surfactant, and:
- 10 to 25 mole %, in particular 10 to 15% of co-surfactant.

The molar percentages of amphiphilic lipid, cationic surfactant and co-surfactant are relative to the whole (amphiphilic lipid/cationic surfactant/co-surfactant/optional helper lipid).

The droplets of the htiRNA hybrid/droplet complex (droplets complexed with a htiRNA hybrid) generally have a diameter of between 20 and 250 nm, typically between 40 and 200 nm. This diameter can particularly be measured by Dynamic Light Scattering on ZetaSizer apparatus, Malvern.

Location of the Components in the Complex

The droplets of the htiRNA hybrid/droplet complex in nanoemulsion form defined above, are organised in core-shell form, where:
- the core comprises:
  - the solubilizing lipid,
  - optional oil,
  - optional imaging agent,
  - optional lipophilic therapeutic agent,
- the shell comprises:
  - the amphiphilic lipid,
  - the cationic surfactant,
  - the co-surfactant (optionally grafted with a molecule of interest),
  - the htiRNA hybrid,
  - optional helper lipid,
  - optional therapeutic agent if amphiphilic.

Method for Preparing the htiRNA Hybrid/Nanoparticle Complex

The htiRNA hybrid/nanoparticle complex in nanoemulsion form described above can be prepared following the preparation method described in application FR 2 994 849, using htiRNA as nucleotide sequence able to modulate endogenous mechanisms of RNA interference.

A third subject of the invention concerns the use of a htiRNA hybrid such as defined above to stabilize a complex between a nanoparticle and said antisense RNA, The invention also concerns a method for stabilizing a complex of an antisense RNA and a nanoparticle, comprising the steps of:
- providing an antisense RNA, a first DNA strand and a second DNA strand such as defined above, and a nanoparticle in particular such as defined above,
- hybridizing in hybridization buffer two molar equivalents of antisense IRNA, one molar equivalent of first DNA strand and one molar equivalent of second DNA strand, after which a htiRNA hybrid such as defined above is obtained,
- complexing the htiRNA hybrid with the nanoparticle.

A fourth subject of the invention concerns a method for inserting in a eukaryote cell an antisense RNA able to modulate endogenous mechanisms of RNA interference, comprising placing the eukaryote cell in contact with the complex of the invention. This method is a transfection method.

The insertion method can be performed in vitro. In this case, and in general, the contacting of the eukaryote cell with the complex of the invention takes place in a buffer solution e.g. OptiMEM® medium. The contact time is generally between 8 and 96 hours, typically about 72 hours at a temperature of about 37° C.

In general, after the contacting step the cells are recovered.

A fifth subject of the invention concerns the complex defined above for use thereof in the prevention or treatment of a disease, in particular a disease of the digestive system such as chronic inflammatory disorders of the intestine, in particular Crohn's disease or haemorrhagic rectocolitis.

The invention also concerns a method for preventing or treating a disease, in particular a disease of the digestive system, such as chronic inflammatory disorders of the intestine, in particular Crohn's disease or haemorrhagic rectocolitis, comprising the administration to a mammal in need thereof, preferably a human in need thereof, of an effective amount of the above-defined complex.

The htiRNA hybrid/nanoparticle complex in nanoemulsion form may comprise a therapeutic agent to treat the disease which provides a double therapeutic effect: that induced by the htiRNA hybrid allowing modulation of endogenous mechanisms of RNA interference and that induced by the therapeutic agent.

Administration can be parenteral, intravenous, oral, topical, intra-rectal or ophthalmological, and is preferably oral which is possible on account of the stability of the complex of the invention against complex physiological fluids and in particular against intestinal media.

The invention is illustrated in connection with the following Figures and examples. Figures FIG. 1: Structure of the htiRNA hybrid.

FIG. 2: Structure of the two monomer units of the htiRNA hybrid, seen as a dimer.

FIG. 3: Structure of an example of htiRNA hybrid («htiGFP») of the invention

Figure 4:
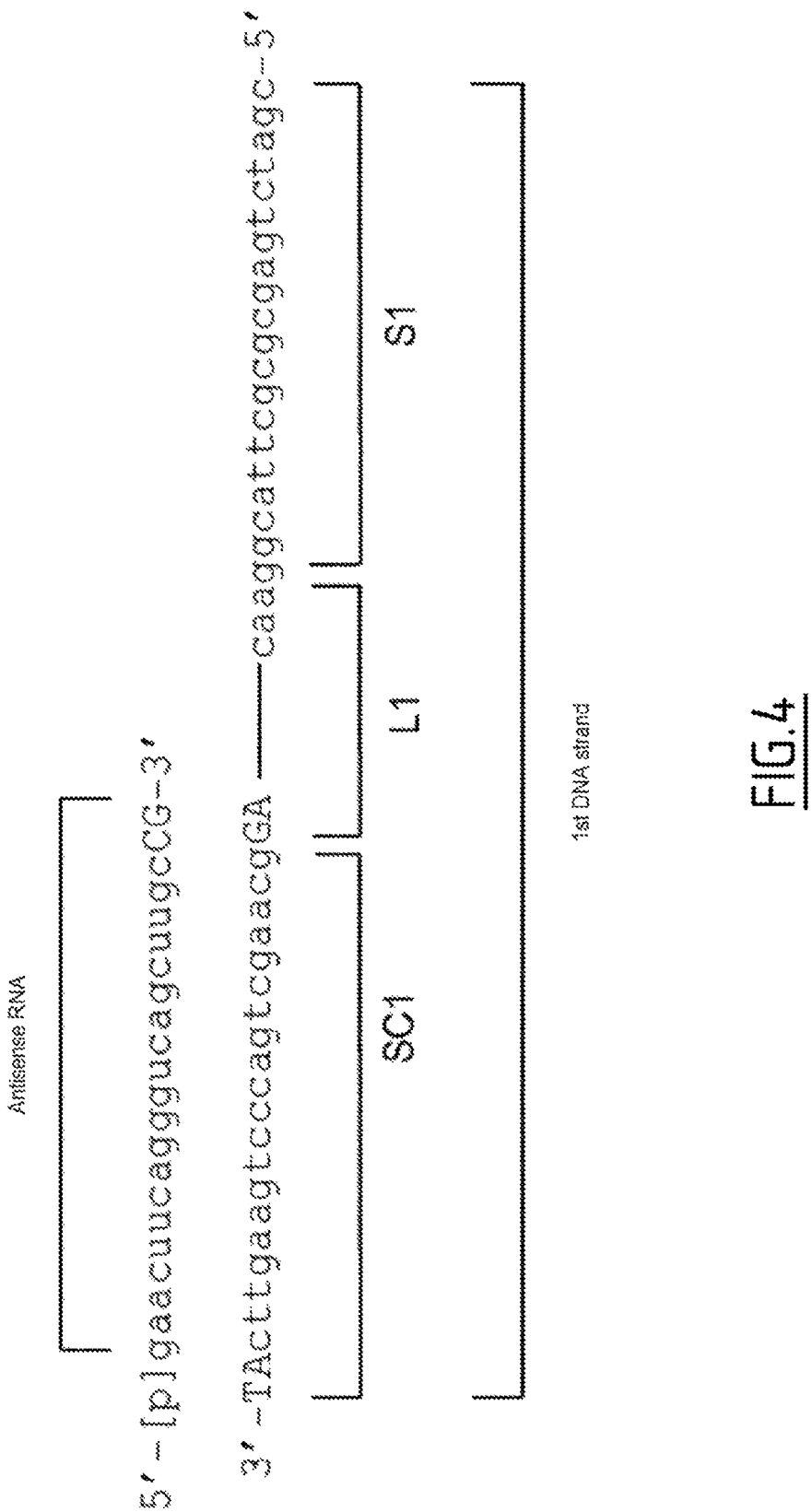

FIG. 4: Structure of a monomer unit of the htiGFP hybrid (comparative).

Figure 5:
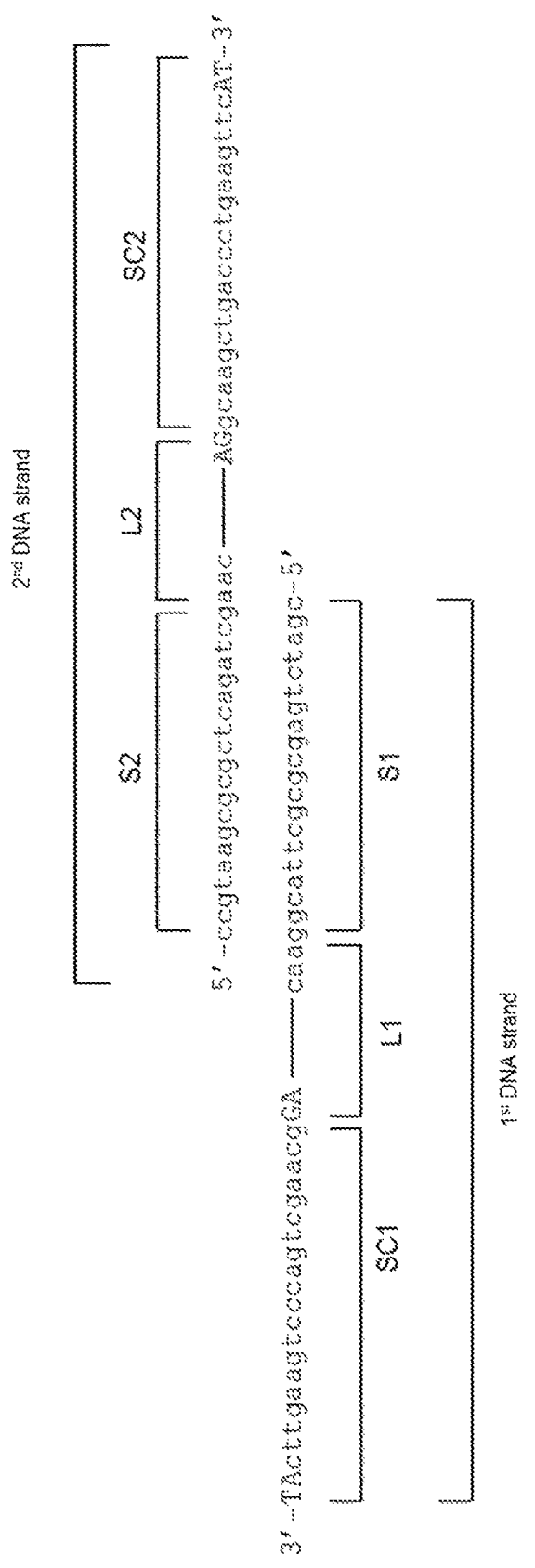

FIG. 5: Structure of a dimer of a first DNA strand/second DNA strand of a htiGFP hybrid, the two strands being hybridized by S1 and S2 (comparative).

Figure 6:
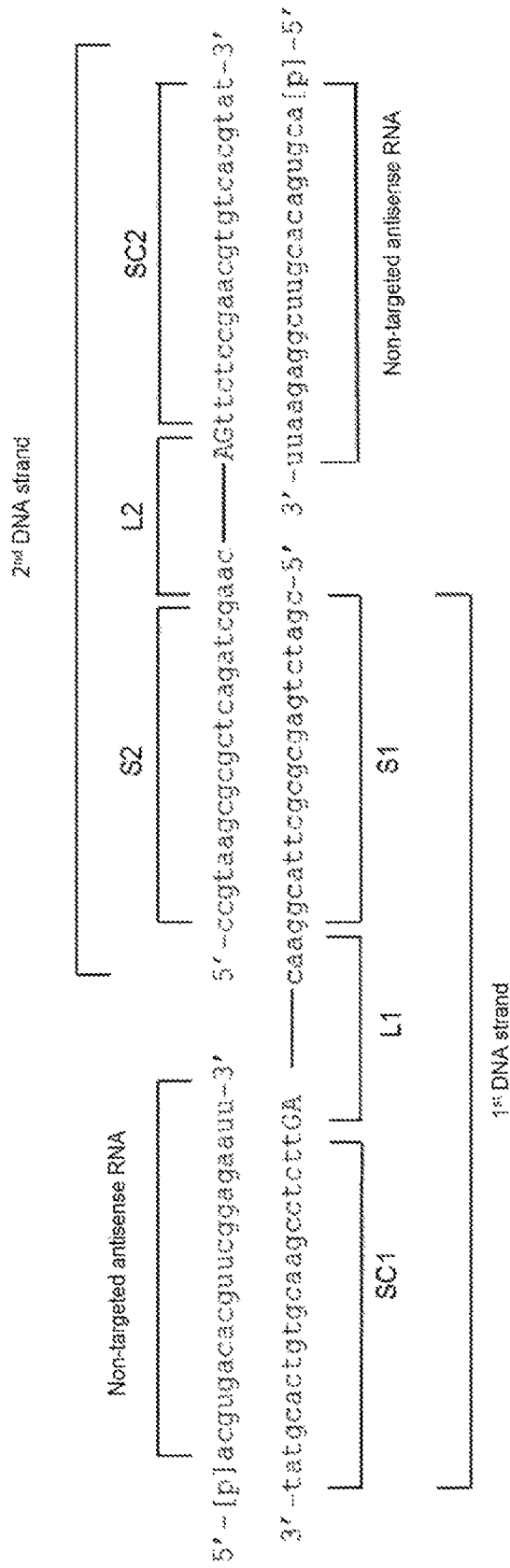

FIG. 6: Structure of control htiRNA («htiCTRL»), in which the antisense RNA of sequence SEQ ID NO:7 is unable to modulate the endogenous mechanisms of RNA interference (control).

Figure 7:
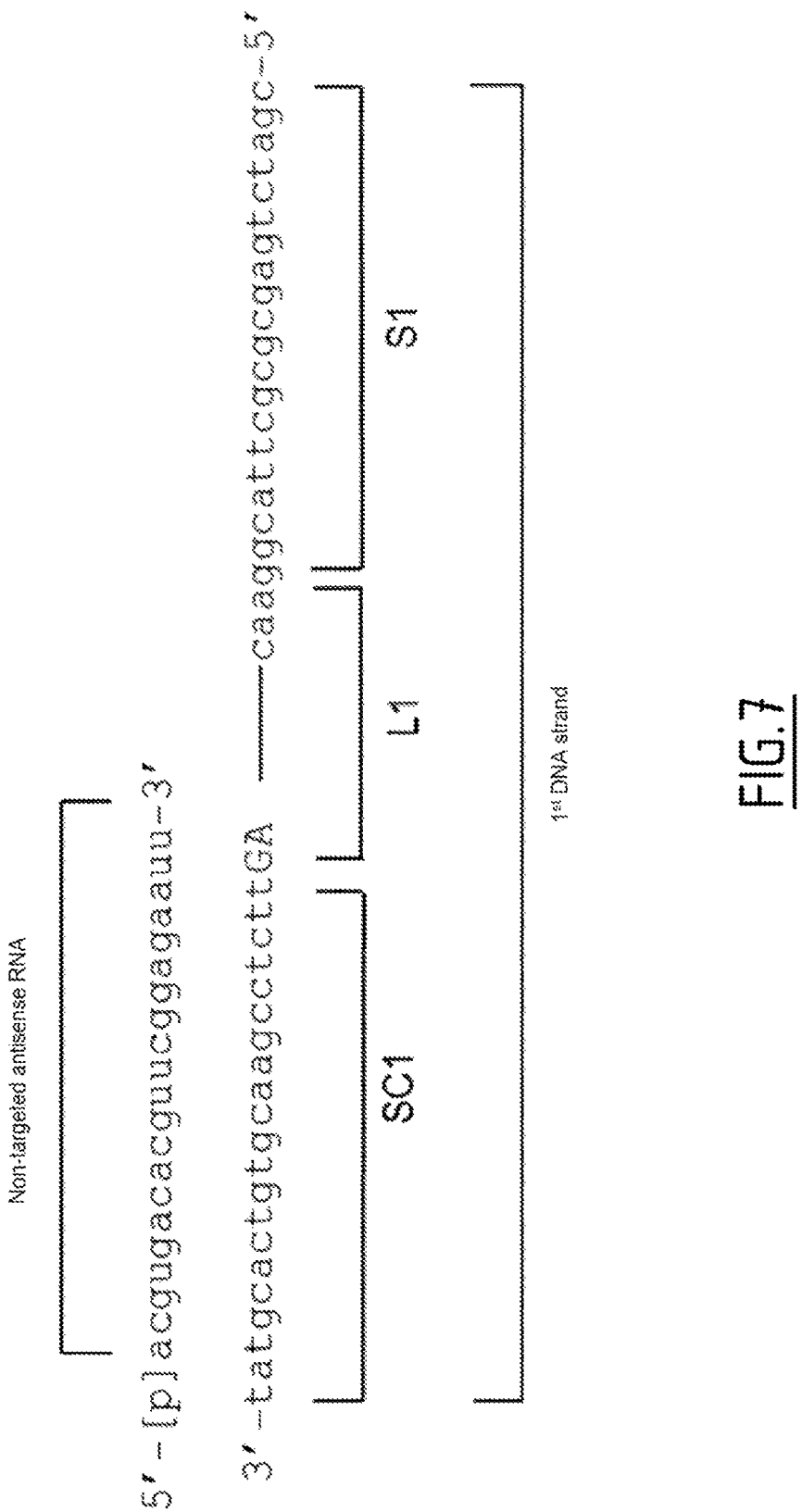

[FIG. 7]: Structure of a monomer unit of the htiCTRL hybrid.

EXAMPLES

Example 1: htiGFP Hybrid 1.1. Preparation of the htiGFP Hybrid

Hybridization of the two monomer units to a dimer ([FIG. 2] FIG. 2) was conducted by heating, following the protocol given in Table 2, to form the htiGFP hybrid having the structure detailed in [FIG. 3] FIG. 3. An interfering RNA targeting the messenger RNA of the gene coding for GFP was used as antisense RNA.

TABLE 2

Protocol for preparing a hybrid DNA-RNA structure « htiGFP » able to modulate endogenous mechanisms of RNA interference.

| Oligonucleotide | Sequence | Supplier | Molar equivalent | Hybridization buffer | Protocol |
|---|---|---|---|---|---|
| Antisense RNA | SEQ ID NO: 3 | IDT DNA | 2 | 100 mM KCl 1 mM MgCl$_2$ 30 mM HEPES pH 7.3 | Heating: 1) 5 minutes at 90° C. 2) 5 minutes at 80° C. 3) 20 minutes at 70° C. Leave to cool slowly down to 25° C. |
| 1$^{st}$ DNA strand | SEQ ID NO: 1 | IDT DNA | 1 | | |
| 2$^{nd}$ DNA strand | SEQ ID NO: 2 | IDT DNA | 1 | | |

Effective hybridization of the two monomer units to a htiGFP hybrid dimer was controlled by electrophoresis on agarose (gel E-gel EX 4% Agarose Sybr Gold, Invitrogen). Migration time was 15 minutes. A molecular weight marker (GeneRuler 50 bp DNA Ladder, Thermo Scientific) was used to demonstrate that the size of the structure obtained lies between the 100 base pair markers (100 bp) and 50 base pair markers 50 (50 bp). The structure of the htiGFP hybrid is 69 base pairs ($n_{SC1}+n_{L1}+n_{S1}+n_{RNA}=n_{SC2}+n_{L2}+n_{S2}+n_{RNA}=69$).

1.2. Preparation of Comparative Structures

To obtain comparative examples, the following were prepared:
 one monomer unit of the htiGFP hybrid ([FIG. 4] FIG. 4),
 a dimer composed of the first DNA strand and second DNA strand, the two strands being hybridized by S1 and S2 (dimer free of antisense RNA) ([FIG. 5] FIG. 5),
 a control hybrid htiCTRL, in which the antisense RNA is not able to modulate the endogenous mechanisms of RNA interference ([FIG. 6] FIG. 6). This non-targeted antisense RNA of sequence SEQ ID NO:7 (Kim et al., 2005) has no specific target on the human genome and is used as control. The first DNA strand of the htiCTRL hybrid has the sequence SEQ ID NO:8, and the second strand has the sequence SEQ ID NO:9. The antisense RNAs and SC1 and SC2 differ between htiGFP and htiCTRL. On the other hand, the spacer arms L1 and L2 and nucleotide sequences S1 and S2 of the htiCTRL hybrid are the same as those of the htiGFP hybrid.

1.3. Functional Activity of the htiGFP Hybrid

A line of prostate cancer tumour cells over-expressing the gene coding for Green Fluorescent Protein (PC3-GFP) was used to validate the functional activity of RNA interference of the different structures described in 1.1 et 1.2.

Each interfering RNA was transfected into the PC3-GFP cell line to a final concentration of 5 to 20 nM using Lipofectamine RNAimax reagent following the manufacturer's instructions.

Fluorescence at 510 nm (GFP emission wavelength) of each cell was quantified under confocal microscopy (>300 cells per condition). Each condition was reproduced at N=3 independent experiments, +/−standard deviation. The results are given in Table 3.

TABLE 3

GFP fluorescence intensity per cell as a function of the structure used.

| | GFP fluorescence intensity per cell (Arbitrary unit, ±standard deviation, N = 3 independent experiments) | | |
|---|---|---|---|
| Concentration | 5 nM | 10 nM | 20 nM |
| Non-treated | 441.23 ± 41.46 | 474.68 ± 103.75 | 462.71 ± 57.27 |
| Non-targeted antisense RNA siAllStar (Qiagen and its complementary strand) (comp.) | 479.02 ± 26.48 | 529.92 ± 86.86 | 561.02 ± 31.85 |
| Antisense RNA GFP siGFP (SEQ ID NO: 3 and its complementary strand (comp.) | 147.38 ± 13.94 | 141.95 ± 21.24 | 117.33 ± 27.66 |
| Monomer unit of the htiCTRL hybrid ([FIG. 7] FIG. 7) (comp.) | 456.09 ± 24.14 | 458.12 ± 48.42 | 540.6 ± 84.28 |
| Monomer unit of the htiGFP hybrid ([FIG. 4] FIG. 4) (comp.) | 256.43 ± 20.37 | 245.89 ± 16.42 | 149.55 ± 29.65 |
| Dimer of 1$^{st}$ DNA strand/2$^{nd}$ DNA strand of the htiGFP hybrid ([FIG. 5] FIG. 5) (comp.) | 523.38 ± 69.67 | 567.72 ± 57.99 | 519.98 ± 67.82 |
| htiCTRL ([FIG. 6] FIG. 6) (comp.) | 502.53 ± 38.22 | 519.1 ± 67.32 | 528.58 ± 46.05 |
| htiGFP ([FIG. 3] FIG. 3) (invention) | 311.79 ± 11.7 | 309.41 ± 75.99 | 237.15 ± 15.5 |

The activity of the htiGFP hybrid maintains activity similar to RNA interference compared with a siRNA having an identical antisense sequence SEQ ID NO:3. According to Table 3, the siRNA targeting the gene coding for GFP (siGFP) strongly decreases the expression of its target gene as seen by a reduction in GFP intensity per cell, when PC3-GFP cells are transfected with this siRNA. After integration of the same sequence of antisense RNA in a hybrid DNA/RNA structure by inverted tandem (htiGFP), and similar to its monomeric sub-unit (monomer unit of the htiGFP hybrid), activity similar to RNA interference is still observed. (Table 3). However, this activity is slightly less than with a siRNA composed solely of RNA (siGFP).

Example 2: Preparation of a Lipid Nanoparticle/htiRNA Hybrid Complex 2.1. Preparation of Lipid Nanoparticles Lipid nanoparticles (LNPs) were prepared by mixing the organic and aqueous phases with a sonication method allowing the generation of nano-droplets. After homogenization at 55° C., the two phases were mixed and sonication cycles performed at 55° C. for 5 minutes (alternating 10 seconds of sonication and 30 seconds rest time). An ultrasonic processor with conical probe of 3 mm was used (AV505 Ultrasonic processor, Sonics), adjusted to 45% power.

The non-encapsulated components were separated from the LNPs by dialysis in a volume of PBS buffer (Phosphate-Buffered Saline) equivalent to 200 times the volume of the LNPs. The PBS buffer was changed twice throughout dialysis which lasted a total time of 24 h. After characterization, the LNPs were filtered on a cellulose membrane of 0.22 μm porosity.

The hydrodynamic diameter, polydispersity index (P01) and zeta potential of the lipid nanoparticles were measured on a Zeta Sizer Nano instrument (NanoZS, Malvern). Hydrodynamic diameter and polydispersity index were measured at a LNP concentration of 0.6 mg/mL in PBS buffer at 25° C. Zeta potential was measured at a concentration of 0.4 mg/mL int mM NaCl buffer, pH 7.4 at 25° C.

TABLE 4

Composition of emulsions comprising nanoparticles CL40 and CL80

| | | Organic phase | | | | | Aqueous phase | | |
|---|---|---|---|---|---|---|---|---|---|
| | | LIPOID S PC-3 | DOTAP | DOPE | SUPER REFINED ® SOYBEAN USP EP-LQ-(MH) | SUPPOCIRE STANDARD | MYRJ ™ S40-PW-(MV) | PBS | Glycerol |
| CL40 | % (Solid phase) | 3.43 | 30.4 | 3.61 | 18.24 | 6.11 | 38.24 | — | — |
| | mg | 3.7 | 32.8 | 3.9 | 19.7 | 6.6 | 41.3 | 1480 | 800 |
| CL80 | % (Solid phase) | 1.47 | 10.01 | — | 44.88 | 14.95 | 28.77 | — | — |
| | mg | 2.2 | 15 | — | 67.1 | 22.4 | 43.1 | 1480 | 800 |

TABLE 5

Lists of products used

| Trade name | Supplier | CAS No: | Description |
|---|---|---|---|
| SUPPOCIRE STANDARD | Gattefossé | 85665-33-4 | Glycerides, C10-18; Triglycerides C10-C18 |
| MYRJ ™ S40-PW-(MV) | CRODA | 9004-99-3 | Polyoxyethylene fatty acid ester |
| SUPER REFINED ® SOYBEAN USP EP-LQ-(MH) | CRODA | 232-274-4 | Soybean oil |
| LIPOID S PC-3 | Lipoid | 97281-48-6 | Phosphatidylcholine hydrogenated (phospholipids) |
| DOTAP | MERCK | 132172-61-3 | 1,2-dioleoyl-3-trimethylammonium-propane |
| DOPE | AvantiPolar | 4004-05-1 | 1,2-dioleoyl-sn-glycero-3-phosphoethanolamine |
| Phosphate Buffered Saline | Sigma | — | Buffer, neutral pH |
| Glycerol | Sigma | 56-81-5 | — |

2.2. Preparation of a Lipid Nanoparticle/htiRNA Hybrid Complex

The htiRNA hybrid in Example 1 was complexed with the nanoparticles prepared in Example 3.1.

The complexes were formed between the different nucleic acids and lipid nanoparticles for 20 minutes in a reaction buffer (154 mM NaCl, 10 mM HEPES, pH 7.2). The quantities of lipid nanoparticles were adjusted to maintain a constant N/P ratio with N/P=36 (N: DOTAP/DOPE amine group; P: phosphate group of the corresponding nucleic acid). A quantity of artificial SHIME medium (Prodigest) was added to a final concentration ranging from 0 to 90% SHIME medium (% V/V). The results are given in Table 6.

TABLE 6

Stability according to proportion of SHIME medium.

| | Volume LNP (μL) | Volume siAllStar 20 μM (μL) | Volume htiGFP 20 μM (μL) | Buffer 154 mM NaCl, 10 mM Hepes, pH 7.2 (μL) | SHIME medium (μL) | Total volume (μL) | Ratio N/P | % SHIME medium | % Stability (Ratio of SHIME control + interfering RNA) |
|---|---|---|---|---|---|---|---|---|---|
| 1 | 0 | 1 | | 39.0 | 0 | 40.00 | 36 | 0.0% | — |
| 2 | 0 | 1 | | 19.0 | 20 | 40.00 | 36 | 50.0% | — |
| 3 | 0.7 | 1 | | 38.3 | 0 | 40.00 | 36 | 0.0% | 92.85 |
| 4 | 0.7 | 1 | | 18.3 | 20 | 40.00 | 36 | 50.0% | 46.11 |
| 5 | 0.7 | 1 | | 14.3 | 24 | 40.00 | 36 | 60.0% | 20.48 |
| 6 | 0.7 | 1 | | 10.3 | 28 | 40.00 | 36 | 70.0% | 2.093 |
| 7 | 0.7 | 1 | | 6.3 | 32 | 40.00 | 36 | 80.0% | 5.114 |
| 8 | 0.7 | 1 | | 2.3 | 36 | 40.00 | 36 | 90.0% | 3.368 |
| 9 | 0 | | 1 | 39.0 | 0 | 40.00 | 36 | 0.0% | — |
| 10 | 0 | | 1 | 19.0 | 20 | 40.00 | 36 | 50.0% | — |
| 11 | 2 | | 1 | 37.0 | 0 | 40.00 | 36 | 0.0% | 96.78 |
| 12 | 2 | | 1 | 17.0 | 20 | 40.00 | 36 | 50.0% | 95.62 |
| 13 | 2 | | 1 | 13.0 | 24 | 40.00 | 36 | 60.0% | 95.82 |
| 14 | 2 | | 1 | 9.0 | 28 | 40.00 | 36 | 70.0% | 94.51 |
| 15 | 2 | | 1 | 5.0 | 32 | 40.00 | 36 | 80.0% | 93.13 |
| 16 | 2 | | 1 | 1.0 | 36 | 40.00 | 36 | 90.0% | 92.89 |

2.3. Increase in the Stability of the Nanoparticle/htiGFP Complex Compared with a Nanoparticle/siGFP Complex, in a Complex Biological Fluid.

The stability:

of the nanoparticle/control siRNA complex (siAllstar, Qiagen, 21 base pairs) or of the nanoparticle/htiGFP complex was monitored by electrophoresis on agarose gel (E-gel 2% Agarose Ethidium Bromide, Invitrogen, migration time 10 minutes) after exposure of the complexes to increasing concentrations of artificial SHIME medium (Prodigest) to reproduce physiological conditions at the distal colon (100% SHIME).

When the concentration of SHIME medium is increased, de-complexing of the nanoparticle/siAllStar complexes can be observed on and after a concentration of 50% SHIME medium, since migration of siAllStar is observed on agarose gel. On the other hand, by means of greater electrostatic interaction, the nanoparticle/htiGFP complex remains stable in this biological fluid as indicated by the absence of migration of htiGFP on agarose gel.

The invention claimed is:

1. A hybrid DNA/RNA molecule, called htiRNA hybrid, comprising:
   two antisense RNA strands of same sequences and able to modulate endogenous mechanisms of RNA interference, each comprising a number of nucleotides $n_{RNA}$ in a range of from 18 to 30, and having a phosphorylated 5' end;
   a first DNA strand, having a nucleotide sequence comprising a nucleotide sequence S1 linked via its 3' end to the 5' end of a nucleotide spacer arm L1 linked by its 3' end to the 5' end of a nucleotide sequence SC1; and
   a second DNA strand, having a nucleotide sequence comprising a nucleotide sequence S2 linked via its 3' end to the 5' end of a nucleotide spacer arm L2 inked via its 3' end to the 5' end of a nucleotide sequence SC2,
   wherein the nucleotide sequence SC1 comprises a number $n_{sc1}$ of nucleotides with $n_{sc1}$ from $(n_{RNA}-3)$ to $(N_{RNA}+3)$, and has at least 40% sequence identity, determined by a global alignment method, with the complementary sequence of the antisense RNA, so that the nucleotide sequence SC1 is hybridized via complementarity to a first of the two antisense RNA strands,
   wherein the nucleotide sequence SC2 comprises a number $n_{sc2}$ of nucleotides with $n_{sc2}$ from $(n_{RNA}-3)$ to $(n_{RNA}+3)$, and has at least 40% sequence identity, determined by a global alignment method, with the complementary sequence of the antisense RNA, so that the nucleotide sequence SC2 is hybridized via complementarity to the second of the two antisense RNA strands,
   wherein the nucleotide sequence S1 of the first DNA strand is complementary to the nucleotide sequence S2 of the second DNA strand, so that the nucleotide sequence S1 of the first DNA strand is hybridized via complementarity to the nucleotide sequence S2 of the second DNA strand,
   wherein the two nucleotide sequences S1 and S2 have the same number $n_{s1-s2}$ of nucleotides, $n_{s1-s2}$ being a number in a range of from 16 to 30,
   wherein the nucleotide spacer arm L1 of the first DNA strand comprises a number $n_{L2}$ of nucleotides and the nucleotide spacer arm L2 of the second DNA strand comprises a number $n_{L2}$ of nucleotides, $n_{L1}$ and $n_{L2}$ independently being a number in a range of from 1 to 15, and
   wherein the two antisense RNA strands, the first DNA strand, and/or the second DNA strand optionally carry one or more lipid groups.

2. The htiRNA hybrid of claim 1, wherein $n_{s1-s2}$ is an integer in a range of from 18 to 22; and/or
   wherein $n_{L1}$ and $n_{L2}$ are independently an integer in a range of from 1 to 15; and/or
   wherein the sum $n_{sc1}+n_{L1}+n_{s1-s2}+n_{RNA}$ and/or the sum $n_{sc2}+n_{L2}+n_{s1-s2}+n_{RNA}$ are higher than or equal to 60.

3. A complex, comprising:
   a nanoparticle; and
   the htiRNA hybrid of claim 1.

4. The complex of claim 3, wherein the nanoparticle is cationic.

5. The complex of claim 3, wherein the nanoparticle is an inorganic, organic, or hybrid organic/inorganic nanoparticle.

6. The complex of claim 3, wherein the nanoparticle is a cationic organic nanoparticle comprising a lipid.

7. The complex of claim 3, in the form of a nanoemulsion comprising a continuous aqueous phase and a dispersed phase, the dispersed phase comprising:
   (a) an amphiphilic lipid in at least 5 mole %;
   (b) a cationic surfactant in a range of from 15 to 70 mole %, the cationic surfactant comprising:
      (i) a lipophilic group comprising: (bi-1) a group R, which is a linear hydrocarbon chain comprising 11 to 23 carbon atoms; (bi-2) a lipophilic group comprising (bi-1) R—(C=O)—, R being a linear hydrocarbon chain comprising 11 to 23 carbon atoms; (bi-3) a fatty acid ester comprising 12 to 24 carbon atoms and phosphatidylethanolamine; (bi-4) a fatty acid amide comprising 12 to 24 carbon atoms and phosphatidylethanolamine, and/or (bi-5) a poly (propylene oxide); and
      (ii) a hydrophilic group comprising: (bii-1) a linear alkyl group comprising 1 to 12 carbon atoms and interrupted and/or substituted by at least one cationic group; (bii-2) a branched alkyl group comprising 1 to 12 carbon atoms and interrupted and/or substituted by at least one cationic group; and/or (bii-3) a polymeric hydrophilic group comprising at least one cationic group; and
   (c) a co-surfactant in a range of from 10 to 55 mole %, the co-surfactant comprising a poly (ethylene oxide) chain comprising at least 25 ethylene oxide units;
   (d) a solubilizing lipid comprising a fatty acid glyceride;
   (e) optionally, a helper lipid;
   (f) the htiRNA hybrid,
   wherein the mole % of the amphiphilic lipid, the cationic surfactant, and the co-surfactant are relative to a molar sum of the amphiphilic lipid, cationic surfactant, co-surfactant, and helper lipid.

8. A method of stabilizing a complex of an antisense RNA and a nanoparticle, the method comprising:
   complexing the htiRNA hybrid of claim 1 with the nanoparticle.

9. A method for inserting in a eukaryote cell an antisense RNA able to modulate endogenous mechanisms of RNA interference, the method comprising:
   placing the eukaryote cell in contact with the complex of claim 3.

10. The htiRNA hybrid of claim 1, wherein $n_{s1-s2}$ is an integer in a range of from 18 to 22.

11. The htiRNA hybrid of claim 1, wherein $n_{L1}$ and $n_{L2}$ are independently an integer in a range of from 2 to 10.

12. The htiRNA hybrid of claim 1, wherein the sum $n_{sc1}+n_{L1}+n_{s1-s2}+n_{RNA}$ and/or the sum $n_{sc2}+n_{L2}+n_{s1-s2}+n_{RNA}$ are higher than or equal to 60.

13. The complex of claim 3, wherein the nanoparticle is a cationic organic nanoparticle comprising a liposome.

14. The complex of claim 3, wherein the nanoparticle is a droplet of a nanoemulsion comprising a continuous aqueous phase and a dispersed lipid phase.

* * * * *

SEQUENCE LISTING

```
<160> NUMBER OF SEQ ID NOS: 9

<210> SEQ ID NO 1
<211> LENGTH: 47
<212> TYPE: DNA
<213> ORGANISM: Artificial Sequence
<220> FEATURE:
<223> OTHER INFORMATION: first DNA strand of hybrid htiGFP

<400> SEQUENCE: 1
cgatctgagc gcgcttacgg aacaggcaag ctgaccctga agttcat        47

<210> SEQ ID NO 2
<211> LENGTH: 47
<212> TYPE: DNA
<213> ORGANISM: Artificial Sequence
<220> FEATURE:
<223> OTHER INFORMATION: second DNA strand of hybrid htiGFP

<400> SEQUENCE: 2
ccgtaagcgc gctcagatcg aacaggcaag ctgaccctga agttcat        47

<210> SEQ ID NO 3
<211> LENGTH: 22
<212> TYPE: RNA
<213> ORGANISM: Homo sapiens
<220> FEATURE:
<221> NAME/KEY: modified_base
```

```
<222> LOCATION: (1)..(1)
<223> OTHER INFORMATION: phosphorylated g

<400> SEQUENCE: 3
gaacuucagg gucagcuugc cg                                                22

<210> SEQ ID NO 4
<211> LENGTH: 22
<212> TYPE: DNA
<213> ORGANISM: Artificial Sequence
<220> FEATURE:
<223> OTHER INFORMATION: The nucleotide sequences SC1 of the first DNA
      strand and SC2 of the second DNA strand

<400> SEQUENCE: 4
gcaagctgac cctgaagttc at                                                22

<210> SEQ ID NO 5
<211> LENGTH: 20
<212> TYPE: DNA
<213> ORGANISM: Artificial Sequence
<220> FEATURE:
<223> OTHER INFORMATION: Nucleotide sequence S1 of the first DNA strand

<400> SEQUENCE: 5
cgatctgagc gcgcttacgg                                                   20

<210> SEQ ID NO 6
<211> LENGTH: 20
<212> TYPE: DNA
<213> ORGANISM: Artificial Sequence
<220> FEATURE:
<223> OTHER INFORMATION: The nucleotide sequence S2 of the second
      DNA strand

<400> SEQUENCE: 6
ccgtaagcgc gctcagatcg                                                   20

<210> SEQ ID NO 7
<211> LENGTH: 21
<212> TYPE: RNA
<213> ORGANISM: Artificial Sequence
<220> FEATURE:
<223> OTHER INFORMATION: Antisense RNA unable to modulate the endogenous
      mechanisms of RNA interference of hybrid htiCTRL
<220> FEATURE:
<221> NAME/KEY: modified_base
<222> LOCATION: (1)..(1)
<223> OTHER INFORMATION: phosphorylated a

<400> SEQUENCE: 7
acgugacacg uucggagaau u                                                 21

<210> SEQ ID NO 8
<211> LENGTH: 46
<212> TYPE: DNA
<213> ORGANISM: Artificial Sequence
<220> FEATURE:
<223> OTHER INFORMATION: The first DNA strand of the htiCTRL hybrid

<400> SEQUENCE: 8
cgatctgagc gcgcttacgg aacagttctc cgaacgtgtc acgtat                      46

<210> SEQ ID NO 9
<211> LENGTH: 46
<212> TYPE: DNA
<213> ORGANISM: Artificial Sequence
```

```
<220> FEATURE:
<223> OTHER INFORMATION: The seond DNA strand of the htiCTRL hybrid

<400> SEQUENCE: 9
ccgtaagcgc gctcagatcg aacagttctc cgaacgtgtc acgtat                        46
```